US008380925B2

(12) United States Patent
Shimozono et al.

(10) Patent No.: US 8,380,925 B2
(45) Date of Patent: Feb. 19, 2013

(54) STORAGE SYSTEM COMPRISING PLURALITY OF PROCESSOR UNITS

(75) Inventors: Norio Shimozono, Machida (JP); Yasuyuki Nagasoe, Kaisei (JP)

(73) Assignee: Hitachi, Ltd., Tokyo (JP)

( * ) Notice: Subject to any disclaimer, the term of this patent is extended or adjusted under 35 U.S.C. 154(b) by 664 days.

(21) Appl. No.: 12/527,492

(22) PCT Filed: May 22, 2009

(86) PCT No.: PCT/JP2009/002276
§ 371 (c)(1),
(2), (4) Date: Aug. 17, 2009

(87) PCT Pub. No.: WO2010/134134
PCT Pub. Date: Nov. 25, 2010

(65) Prior Publication Data
US 2010/0306465 A1 Dec. 2, 2010

(51) Int. Cl.
*G06F 12/14* (2006.01)
(52) U.S. Cl. .................. 711/114; 711/E12.098; 711/105
(58) Field of Classification Search .......................... None
See application file for complete search history.

(56) References Cited

U.S. PATENT DOCUMENTS

| 6,502,167 | B1 * | 12/2002 | Tanaka et al. | 711/114 |
| 6,675,268 | B1 * | 1/2004 | Binford et al. | 711/151 |
| 7,062,628 | B2 * | 6/2006 | Amano | 711/170 |
| 7,065,624 | B1 * | 6/2006 | Zahavi | 711/170 |
| 2004/0034751 | A1 * | 2/2004 | Horn et al. | 711/158 |
| 2004/0054850 | A1 * | 3/2004 | Fisk | 711/112 |
| 2005/0108477 | A1 * | 5/2005 | Kawasaki et al. | 711/114 |
| 2005/0267929 | A1 * | 12/2005 | Kitamura | 709/201 |
| 2006/0059308 | A1 * | 3/2006 | Uratani et al. | 711/114 |
| 2006/0095656 | A1 * | 5/2006 | Ueoka et al. | 711/111 |
| 2006/0242378 | A1 * | 10/2006 | Kano | 711/170 |
| 2006/0294303 | A1 * | 12/2006 | Shimoi et al. | 711/114 |
| 2007/0079098 | A1 * | 4/2007 | Kitamura | 711/170 |
| 2007/0101082 | A1 * | 5/2007 | Sugiura et al. | 711/165 |
| 2008/0263190 | A1 | 10/2008 | Serizawa et al. | |
| 2009/0064159 | A1 * | 3/2009 | LaFrese et al. | 718/104 |
| 2009/0172693 | A1 * | 7/2009 | Corum et al. | 718/105 |

FOREIGN PATENT DOCUMENTS

EP 1783594 A1 5/2007
JP 2008-269424 11/2008

OTHER PUBLICATIONS

Guillermo A. Alvarez et al. "MINERVA: An Automated Resource Provisioning Tool for Large-Scale Storage Systems." 2001. HP. HPL-2001-139.*

* cited by examiner

*Primary Examiner* — Nathan Sadler
(74) *Attorney, Agent, or Firm* — Brundidge & Stanger, P.C.

(57) ABSTRACT

The present invention allows load balancing between processor units without impacting the I/O performance of the storage system. An LDEV owner right is changed on the basis of static information that does not dynamically change in accordance with the number of I/O commands relating to a LDEV. This information is a load index determined for each LDEV. Any of a plurality of processor units selects a processor unit that is to be an assignment destination of the owner right of a target LDEV, based on the load index that has been assigned to each processor unit and the load index of the target LDEV, and assigns this owner right to the selected processor unit. The load index assigned to the processor unit is a value based on the load index of one or more LDEV respectively corresponding to one or more owner rights assigned to this processor unit.

15 Claims, 27 Drawing Sheets

FIG.10

LDEV SETUP 1001

VDEV ID# [ 001 ]  [ OK ]

LDEV ID# [ 0001 ] [ CANCEL ]

LDEV NUM [ 004 ]

| LDEV ID# | SIZE(GB) | OWNER |
|---|---|---|
| 0001 | 32 | "AUTO" |
| 0002 | 32 | "AUTO" |
| 0003 | 32 | "AUTO" |
| 0004 | 32 | ▼ |
|  |  |  |
|  |  |  |

AUTO
00
01
02
03

| FE PORT ID | | 0 |
|---|---|---|
| LUN | LDEV ID | OWNER MP-PK ID |
| 0 | 0001 | 0 |
| 1 | 0003 | 2 |
| 2 | 0000 | 1 |
| ... | | ... |

|  | SAS HDD | SATA HDD | SSD |
|---|---|---|---|
| RAID1 (2D2P) | 800 | 600 | 40000 |
| RAID1 (4D4P) | 1600 | 1200 | 80000 |
| RAID5 (3D1P) | 800 | 600 | 40000 |
| RAID5 (7D1P) | 1600 | 1200 | 80000 |
| RAID6 (6D2P) | 1600 | 1200 | 80000 |

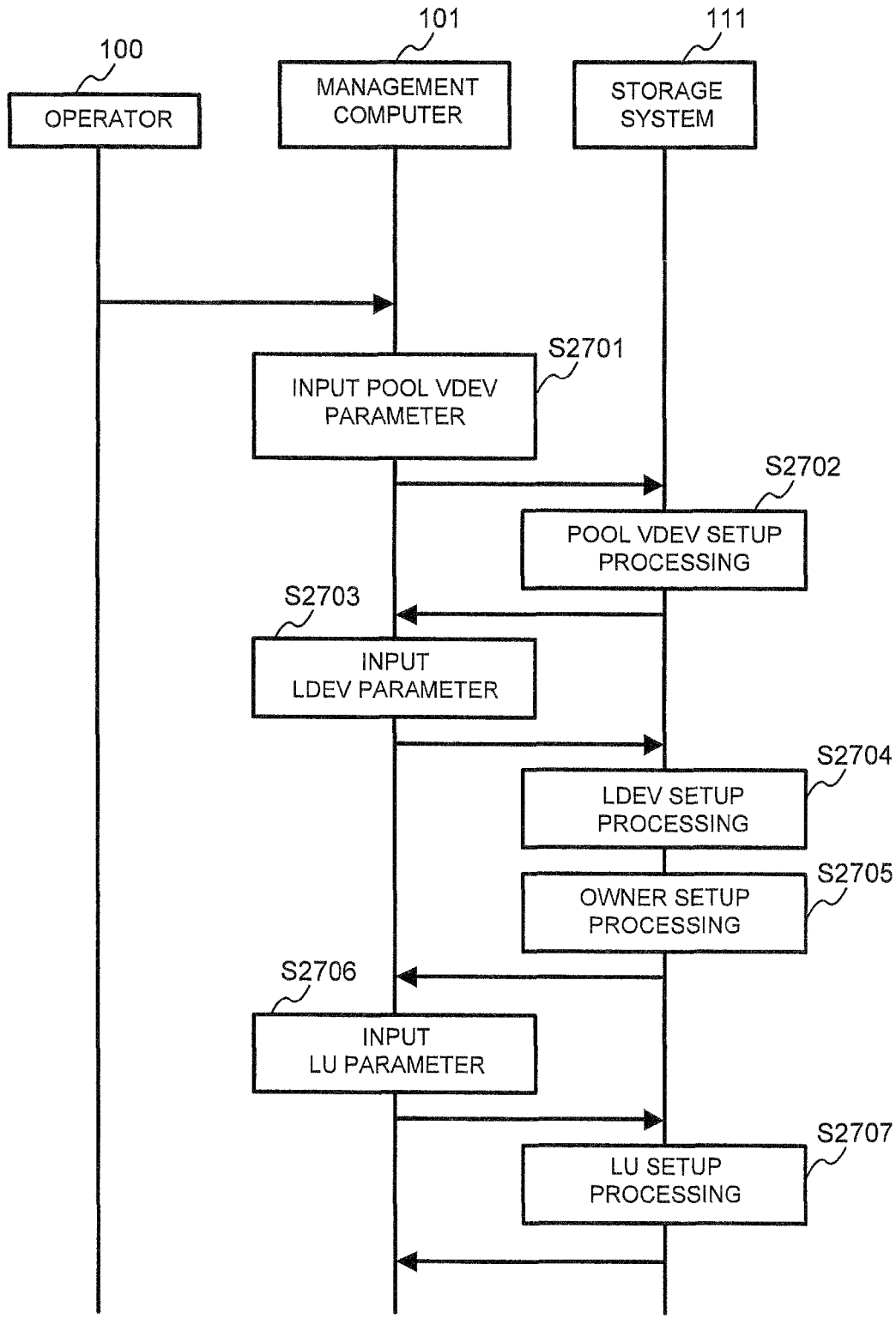

STORAGE SYSTEM COMPRISING PLURALITY OF PROCESSOR UNITS

TECHNICAL FIELD

The present invention generally related to a storage system comprising a plurality of processor units.

BACKGROUND ART

The storage system disclosed in Patent Citation 1, for example, is known as a storage system comprising a plurality of processor units.

In this type of storage system, an owner right is granted to each processor unit for one or more LDEV of a plurality of LDEV. As used here, "LDEV owner right" is the right to access the LDEV. An "LDEV" is a logical storage device managed by the storage system.

For example, it is supposed that the storage system has processor units #0 and #1, and manages LDEV #0, #1 and #2, and that the LDEV #1 owner right has been granted to processor unit #0. This storage system is such that when the storage system receives an I/O (Input/Output) command for LDEV #1, the processor unit #0, which has the LDEV #1 owner right, processes this I/O command.

Centralizing the owner rights for a plurality of LDEV in one processor unit intensifies the load on this processor unit. According to Patent Citation 1, the load on each processor unit is monitored, and owner rights change among the processor units in accordance with the results of this monitoring.

CITATION LIST

Patent Literature
  PTL 1: Japanese Patent Laid-open Publication 2008-269424

DISCLOSURE OF INVENTION

Technical Problem

Storage system operation commences (that is, the storage system is able to receive and process an I/O command from an external device) subsequent to the storage system configuration being changed (for example, subsequent to an LDEV being added, or subsequent to a processor unit being added). The load on each processor unit may be changed while the storage system is in operation.

Normally, it takes time for the load on a processor unit to stabilize after a storage system configuration change. For this reason, it is necessary to wait until an owner right change (load balancing) is performed.

Normally, the I/O performance of the storage system drops while the owner right is being changed. This is because various processing (for example, a process for changing the settings of the ports, and a process for migrating control information regarding LDEV between processors) is required to change the owner right.

Accordingly, an object of the present invention is to make it possible to carry out load balancing between processor units with as little impact on the I/O processing of the storage system as possible.

Solution to Problem

A change of the LDEV owner right is carried out based on static information that does do dynamically change in accordance with the number of I/O commands related to a LDEV. Specifically, this change is performed as follows.

A plurality of processor units comprises two or more processor units that process I/O (Input/Output) commands from an external device.

A load index determined for each LDEV is stored in a storage resource of the storage system (for example, a shared memory capable of being accessed from the plurality of processor units). Each LDEV load index is a static value that does not dynamically change in accordance with the number of I/O commands related to a LDEV.

Any of the plurality of processor units selects a processor unit that is to be the assignment-destination of the owner right for a targeted LDEV from among the above-mentioned two or more processor units, and assigns the owner right to the selected processor unit based on the following (X1) and (X2):

(X1) the load index assigned to each of the above-mentioned two or more processor units; and (X2) the load index of the targeted LDEV.

The processor unit that carries out this processing may be any of the above-mentioned two or more processor units (in other words, a processor unit that is able to process an I/O command), or may also be a different processor unit (for example, a processor unit for which the LDEV owner right will change, but which does not process an I/O command).

The above-mentioned (X1) load index for a processor unit is a value based on the load index of one or more LDEV respectively corresponding one or more owner rights assigned to this processor unit. This value is computed using a computational formula that uses more than one load index (for example, the sum of more than one load index).

The processor unit has one or a plurality of processors (for example, a micro-processor). That is, the processor unit may be one processor, or it may be a group of a plurality of processors.

A PDEV (physical storage device), which that is the basis of the LDEV, may be provided in the storage system, or may be provided outside of the storage system (for example, in a different storage system).

BRIEF DESCRIPTION OF DRAWINGS

FIG. 10 shows a LDEV setup window 1001.
FIG. 13 shows the configuration of a routing table 415 (and a LU-path table 413).

FIG. 27 shows the overall flow of virtual LDEV augmentation.

REFERENCE SIGNS LIST

111 ... storage system

BEST MODE FOR CARRYING OUT THE INVENTION

Figure 1:
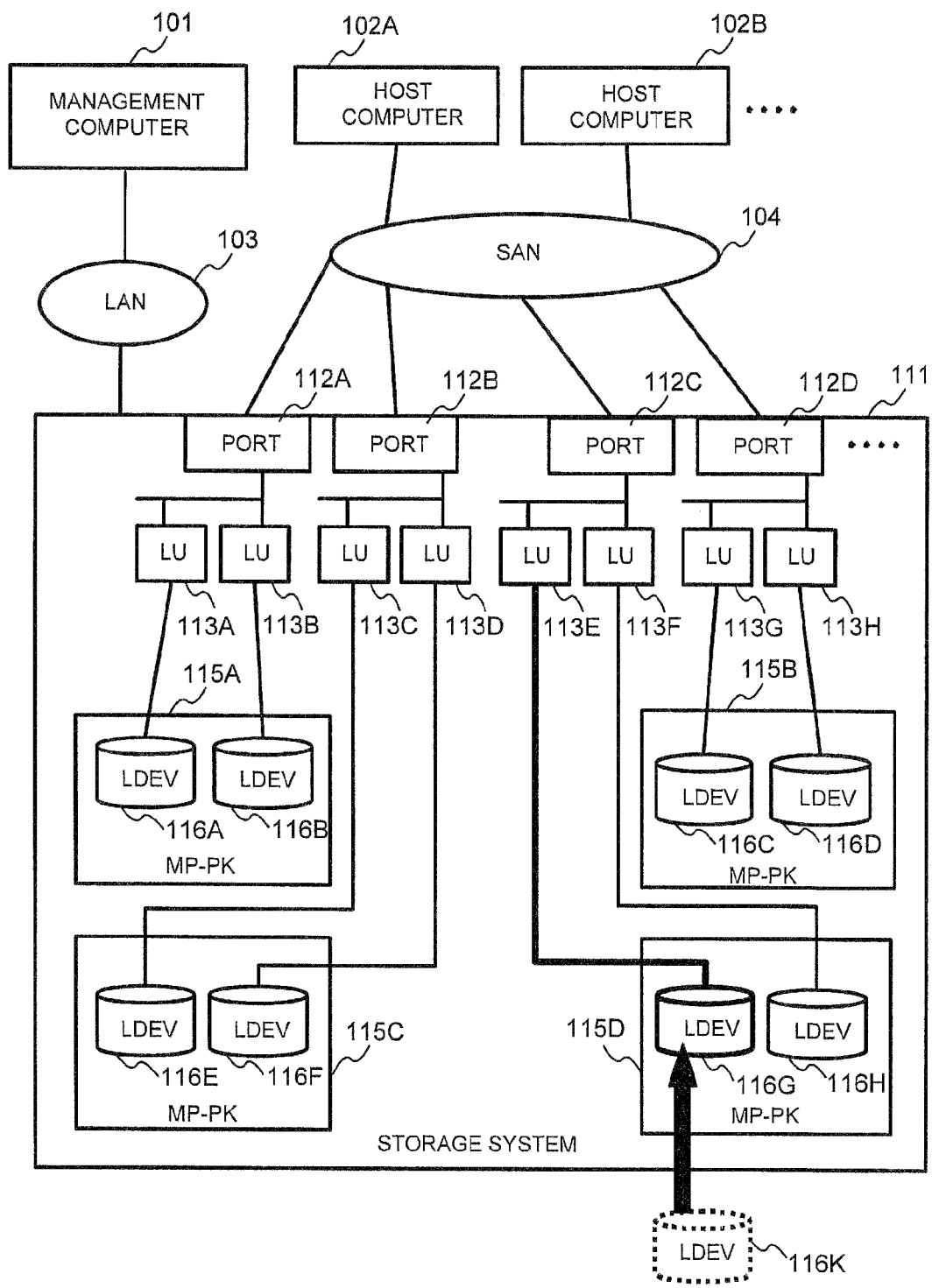
FIG. 1 shows an overview of a first embodiment of the present invention.

A number of embodiments of the present invention will be explained below by referring to the drawings. Further, when the term computer program is the subject of a sentence hereinbelow, the processing is actually being carried out by the micro-processor (MP) that executes this computer program.

Mode for the Invention 1

FIG. 1 shows an overview of the first embodiment of the present invention. In FIG. 1, reference numerals for the same type of elements are configured by combining the same parent number with a different child symbol. However, in the following explanation, in a case where there is no clear distinction made between same type components, these components will be explained using only the parent number.

A management computer 101 and a storage system 111 are able to communicate with one another via a first communication network (for example, a LAN (Local Area Network) 103).

The storage system 111 receives I/O commands from a plurality of (or one) host computers (hereinafter, host) 102 via a second communication network (for example, a SAN (Storage Area Network) 104).

The storage system 111 has a plurality of ports 112, and a plurality of microprocessor packages (hereinafter, MP-PK) 115.

More than one LU 113 is associated to each port 112. A LDEV 116 is associated to a LU (Logical Unit) 113. In other words, the path to the LDEV 116 is defined by combining the port 112 and the LU 113.

The host 102 specifies port 112 and LU 113 to access LDEV 116. Specifically, for example, the host 102 sends an I/O command comprising the port number and the LUN (Logical Unit Number). In accordance with this, the LDEV 116 that corresponds to the port number and LUN is specified, and this I/O command is transferred to the MP-PK 115 that has the owner right for the specified LDEV 116. In the example of FIG. 1, owner rights for two LDEV are assigned to each of MP-PK 115A, 115B, and 115C in addition to MP-PK 115D. In a case where an I/O command comprising the port number port 112D and the LUN LU 113G has been received, this I/O command is transferred to and processed by MP-PK 115B, which has the owner right for LDEV 116C corresponding to port 112D and LU 113G.

In this embodiment, when LDEV 116K is added, any of the MP-PK 115 will assign the owner right for LDEV 116K to MP-PK 115D, which has the smallest ALI (Assigned Load Index), based on the LI (Load Index) of LDEV 116K. The LI of a LDEV is an index of MP performance for processing I/O command regarding the LDEV. MP-PK 115 calculates LI of a LDEV based on configuration information related to the LDEV. And the ALI of a MP-PK 115 is sum of LIs of LDEVs whose owner right are assigned to the MP-PK 115. The MP-PK 115 determines the assignment destination of the owner right for the LDEV 116 such that the ALI of the respective MP-PK 115 are as equable as possible, thereby equalizing the load of the respective LDEV.

Figure 2:
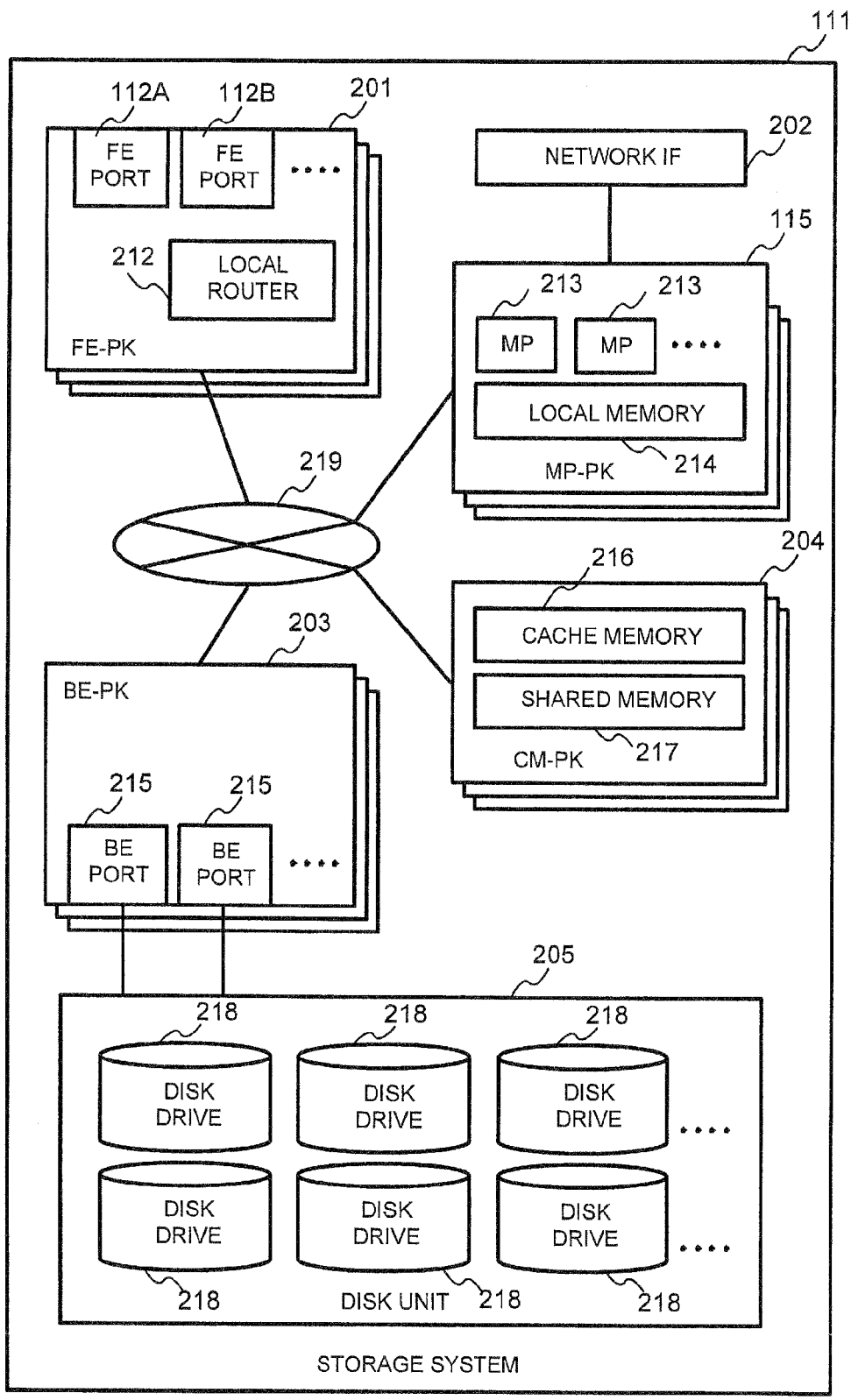
FIG. 2 shows the hardware configuration of a storage system 111.

FIG. 2 shows the hardware configuration of the storage system 111.

The storage system 111 is broadly divided into one or a plurality of disk units 205 and a controller.

The disk unit 205 is an enclosure for connecting a disk drive 218 to a BE (Back End) port 215. The disk unit 205 has a plurality of disk slots, and a disk drive 218 is inserted into each disk slot. Consequently, the disk unit 205 has a plurality of disk drives 218. The disk drive 218 is a physical storage device (PDEV). The disk drive 218, for example, is a HDD (Hard Disk Drive) or SSD (Solid State Drive). The HDD, for example, can include a SAS (Serial Attached SCSI) drive and a SATA (Serial ATA (Advanced Technology Attachment)) drive. The disk drive 218 is not limited thereto, and other types of disk drives (for example, an FC drive, DVD (Digital Versatile Disk) drive) may also be used. Similarly, other types of PDEV besides the disk drive 218 may also be used.

The controller has a plurality of front end packages (hereinafter, FE-PK) 201, a plurality of MP-PK 115, a plurality of cache memories (hereinafter, CM-PK) 204, a plurality of back end packages (hereinafter, BE-PK) 203, a network interface 202, and an internal network 219. The respective packages are interconnected by way of the internal network (for example, a crossbar switch) 280. Furthermore, at least one of the FE-PK 201, MP-PK 115, CM-PK 204 and BE-PK 203 may number just one. In this embodiment, an LDEV owner right is assigned to each MP-PK 115, but in a case where there is only one MP-PK 115, an LDEV owner right may be assigned to each of the plurality of MP in this MP-PK 115.

The FE-PK 201 has more than one FE (Front End) port 112 and a local router 212. The FE port 112 is the port 112 shown in FIG. 1. The FE port 112 receives the I/O command (write command/read command) from the host 102. The local router 212 has a routing table 415 like that shown in FIG. 4. The local router 212 specifies the owner MP-PK (the MP-PK that has the owner right) 115 of the LDEV that corresponds to the port number and LUN of the received I/O command and transfers this I/O command to the owner MP-PK 115 based on the routing table 415. Furthermore, any local router 212 may not be included this storage system 111. In this case, the prescribed MP-PK may receive a I/O command, refer to the routing table 415, and transfer this I/O command to the owner MP-PK 115.

The MP-PK 115 has a plurality of (or one) MP 213 and a local memory 214. The MP 213 executes a variety of processing (for example, the processing of the I/O command from the host 102, and the changing of the LDEV owner right) by executing a computer program. The local memory 214 is able to store various data, for example, a computer program executed by the MP 213, and control information used by the computer program. The MP-PK 115 communicates with the management computer 101 through the network interface 202. The network interface 202 is a communication interface device, for example, a LAN controller.

The CM-PK 204 has one or a plurality of memories. For example, the CM-PK 204 has a cache memory 216 and a shared memory 217. The cache memory 216 temporarily stores the host data written to the LDEV 116 from the host 102, and the host data read out from the LDEV 116 by the host 102. The shared memory 217 stores control information for communicating between MP-PKs. The control information comprises configuration data related to the configuration of the storage system 111.

The BE-PK 203 has more than one BE port 215. A disk drive 218 is communicably connected to the BE port 215.

In this storage system 111, a write command, for example, is processed using the following processing flow. That is, the FE port 112 of the FE-PK 201 receives the write command from the host 102. The local router 212 specifies the owner MP-PK 115 of the LDEV (hereinafter, referred to as the "target LDEV" in this paragraph) corresponding to the port number and LUN inside this write command, and transfers this write command to this owner MP-PK 115. In response to this write command, any MP 213 inside the owner MP-PK 115 writes the data accompanying this command (the write data) to the cache memory 216. This MP 213 reports write-complete to the host 102. Any MP 213 inside the owner MP-PK 115 reads the write data out from the cache memory 216, and writes this write data to the disk drive 218 that constitutes the basis of the target LDEV.

In this storage system 111, a read command, for example, is processed using the following processing flow. That is, the FE port 112 of the FE-PK 201 receives the read command from the host 102. The local router 212 specifies the owner MP-PK 115 of the LDEV (hereinafter, referred to as the "target LDEV" in this paragraph) corresponding to the port number and the LUN inside this read command, and transfers this read command to the owner MP-PK 115. In response to this read command, any MP 213 inside the owner MP-PK 115 reads out data in accordance with this command (the read data) from the disk drive 218 that constitutes the basis of the target LDEV, and writes this read data to the cache memory 216. This MP 213 reads out the read data from the cache memory 216, and sends the read-out read data to the host 102 via the FE-PK 201.

Figure 3:
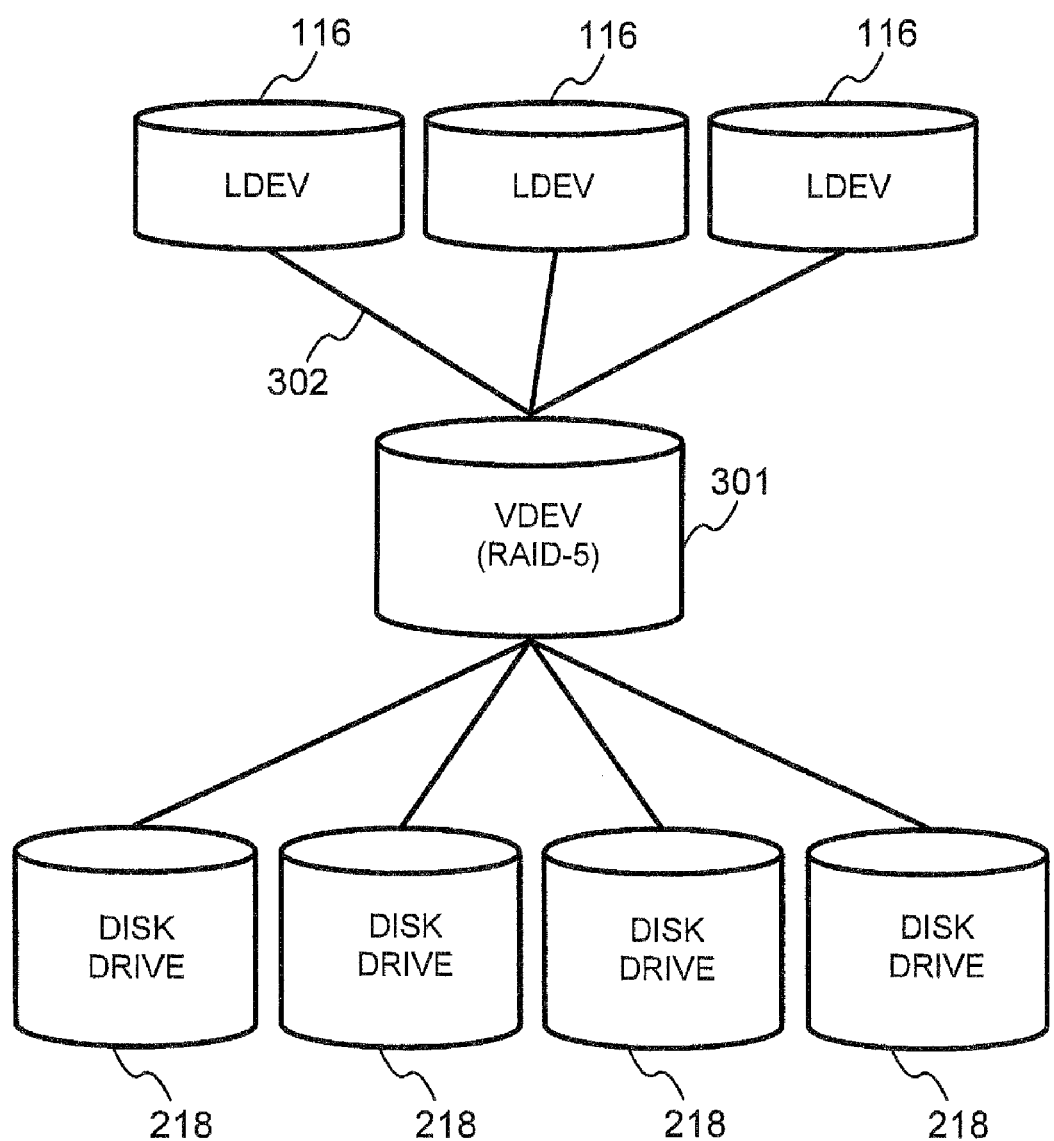
FIG. 3 shows a storage area management scheme of the storage system 111.

FIG. 3 shows a storage area management scheme of the storage system 111.

A RAID (Redundant Array of Independent (or Inexpensive) Disks) Group is configured from a plurality of disk drives 218. The storage space based on the RAID Group is a virtual device (VDEV) 301. The VDEV 301 shown in FIG. 3 is a device based on a RAID Group with a RAID level of RAID-5. One or a plurality of LDEV 116 is formed on the basis of the VDEV 301.

Figure 4:
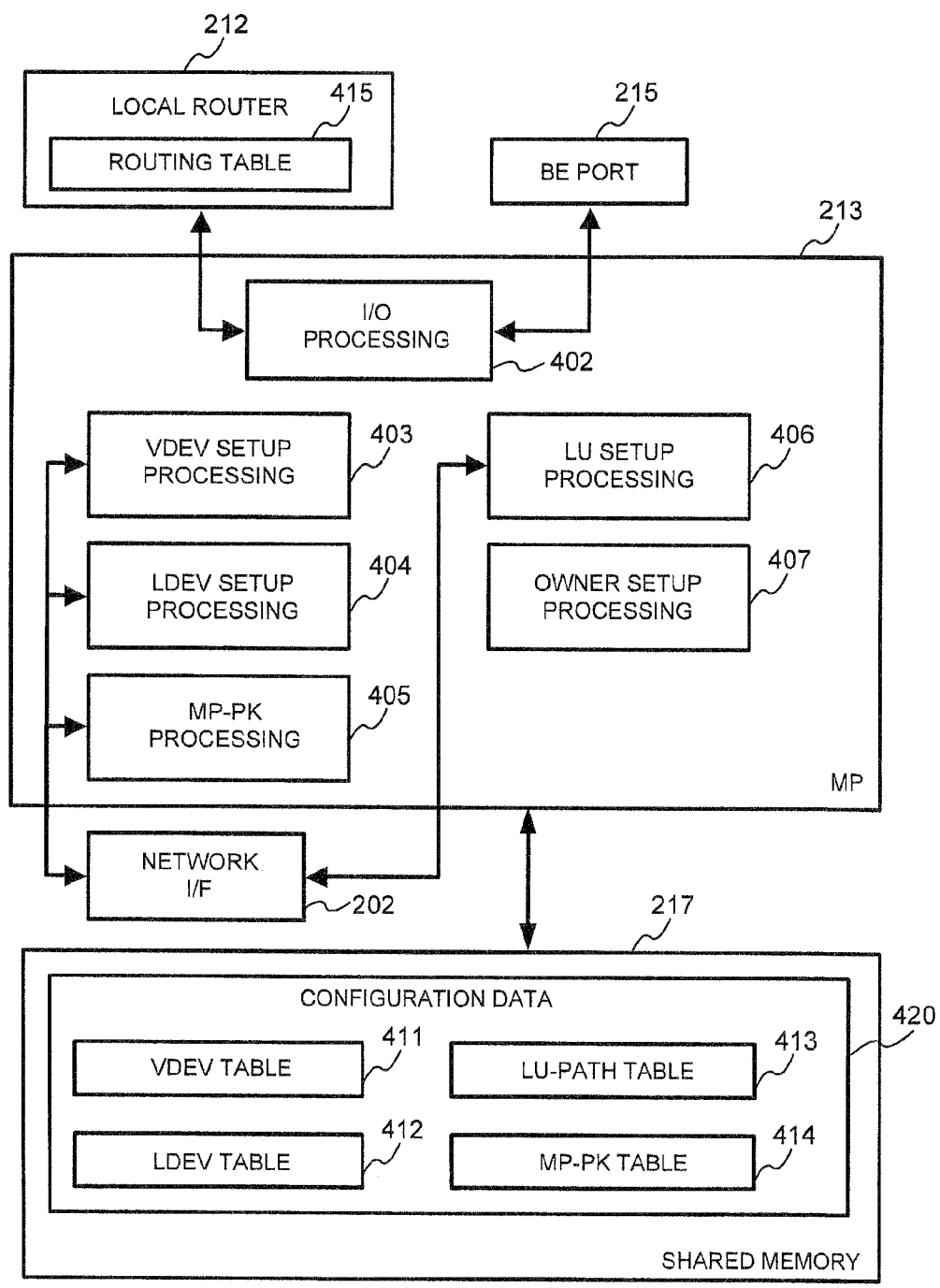
FIG. 4 shows computer programs that are executed in a MP 213, and the information included in the configuration data 420 inside a shared memory 217.

FIG. 4 shows the computer programs executed by the MP 213, and information included in the configuration data 420 inside the shared memory 217.

The configuration data 420 comprises the following tables:
a VDEV table 411 in which information related to the VDEV 301 is set;
a LDEV table 412 in which information related to the LDEV 116 is set;
a LU-path table 413 in which information related to a path (relationship between a LU and a LDEV) is set; and
a MP-PK table 414 in which information related to the MP-PK 115 is set.

The computer programs executed by the MP 213, for example, include an I/O processing program 402, a VDEV setup processing program 403, a LDEV setup processing program 404, a MP-PK processing program 405, a LU setup processing program 406 and an owner setup processing program 407.

The I/O processing program 402 processes an I/O command sent from the local router 212 based on the configuration data 420. To speed up I/O command processing, a portion of the configuration data 420 may be copied to the local memory 214 (Refer to FIG. 2), and this copied data may be referenced.

The VDEV setup processing program 403 sets up the VDEV 301 (sets the VDEV table 411).

The LDEV setup processing program 404 sets up the LDEV 116 (sets the LDEV table 412).

The MK-PK processing program 405 sets up the MP-PK 115 (sets the MP-PK table 414)

The LU setup processing program 406 sets up the LU (sets the LU-path table 413).

The owner setup processing program 407 is called from the LDEV setup processing program 404. The owner setup processing program 407 sets the owner right for the LDEV 116.

The programs 403 through 406 communicate with the management computer 101 via the network IF 202. The I/O processing program 402 accesses the disk drive 218 via the BE port 215.

In this embodiment, all the MP-PK 115 execute the above-mentioned programs 402 through 407, but at least one MP-PK does not execute the program 402 (in this case, the LDEV owner right is not assigned to this MP-PK).

Figure 5:
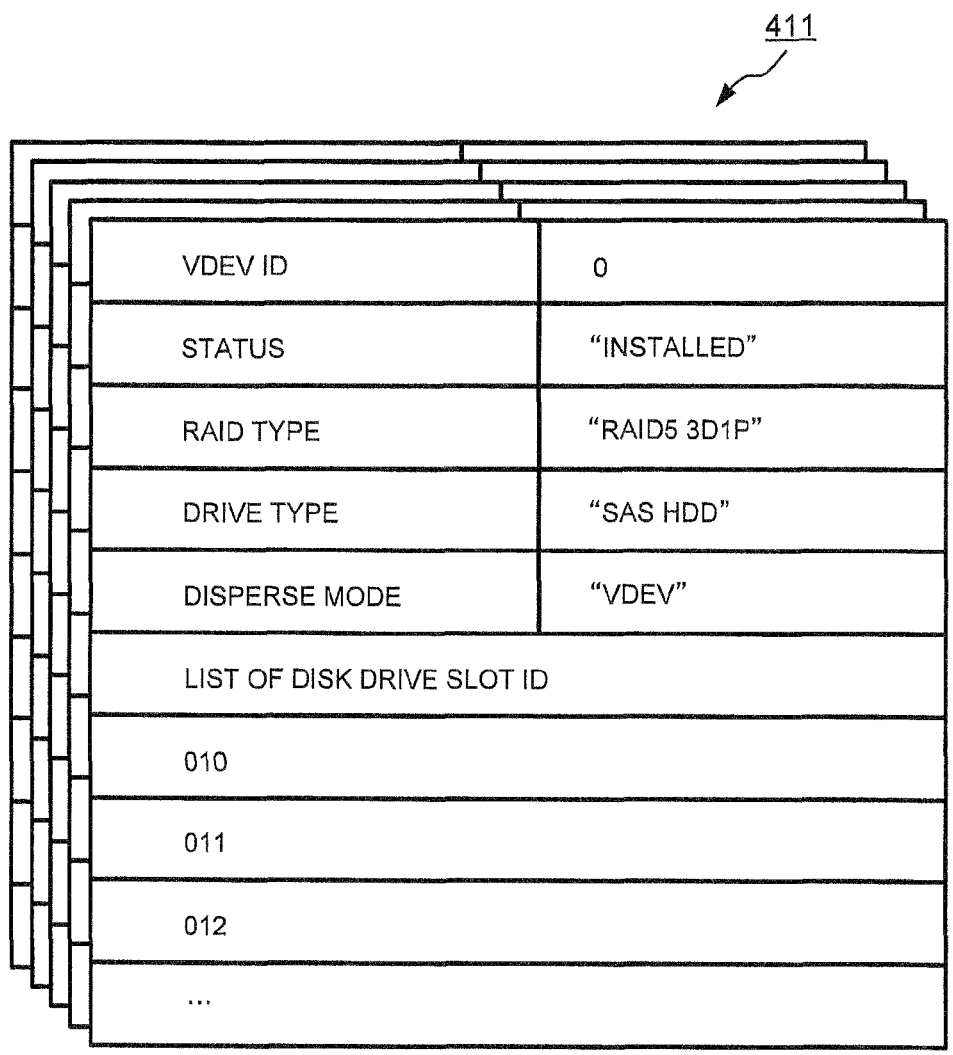
FIG. 5 shows the configuration of a VDEV table 411.

FIG. 5 shows the configuration of the VDEV table 411.

The VDEV table 411 has a VDEV ID, a status, a RAID type, a drive type, a disperse mode, and a list of disk drive slot IDs for each VDEV. These elements will be explained hereinbelow by giving as an example one VDEV (hereinafter referred to as the "target VDEV" in the explanations of FIGS. 5 through 7).

The VDEV ID is the target VDEV identifier.

The status is the target VDEV status. The status value, for example, includes "Installed," which is the state in which the target VDEV is mounted, and "Not-Installed", which is the state in which the target VDEV is not mounted.

The RAID type is the RAID type of the RAID Group constituting the basis of the target VDEV.

The drive type is the type of each disk drive of the RAID Group that constitutes the basis of the target VDEV. In this embodiment, the drive type includes three types, i.e. "SAS HDD", "SATA HDD" and "SSD".

The disperse mode is the mode related to the automatic dispersion of LDEV owner rights. The disperse mode value, for example, includes "VDEV", which sets the LDEV owner right in VDEV units, and "LDEV", which sets the LDEV owner right in LDEV units. In the case of the disperse mode "VDEV", the owner rights of all the LDEV included in the target VDEV are assigned to one MP-PK 115. Conversely, in the case of disperse mode "LDEV", all the LDEV owner rights included in the target VDEV may be assigned to one MP-PK 115 or may be assigned to two or more MP-PK 115.

The disk drive slot ID list is a list of the IDs of slots into which the respective disk drives configuring the RAID Group that constitutes the basis of the target VDEV are inserted.

Figure 6:
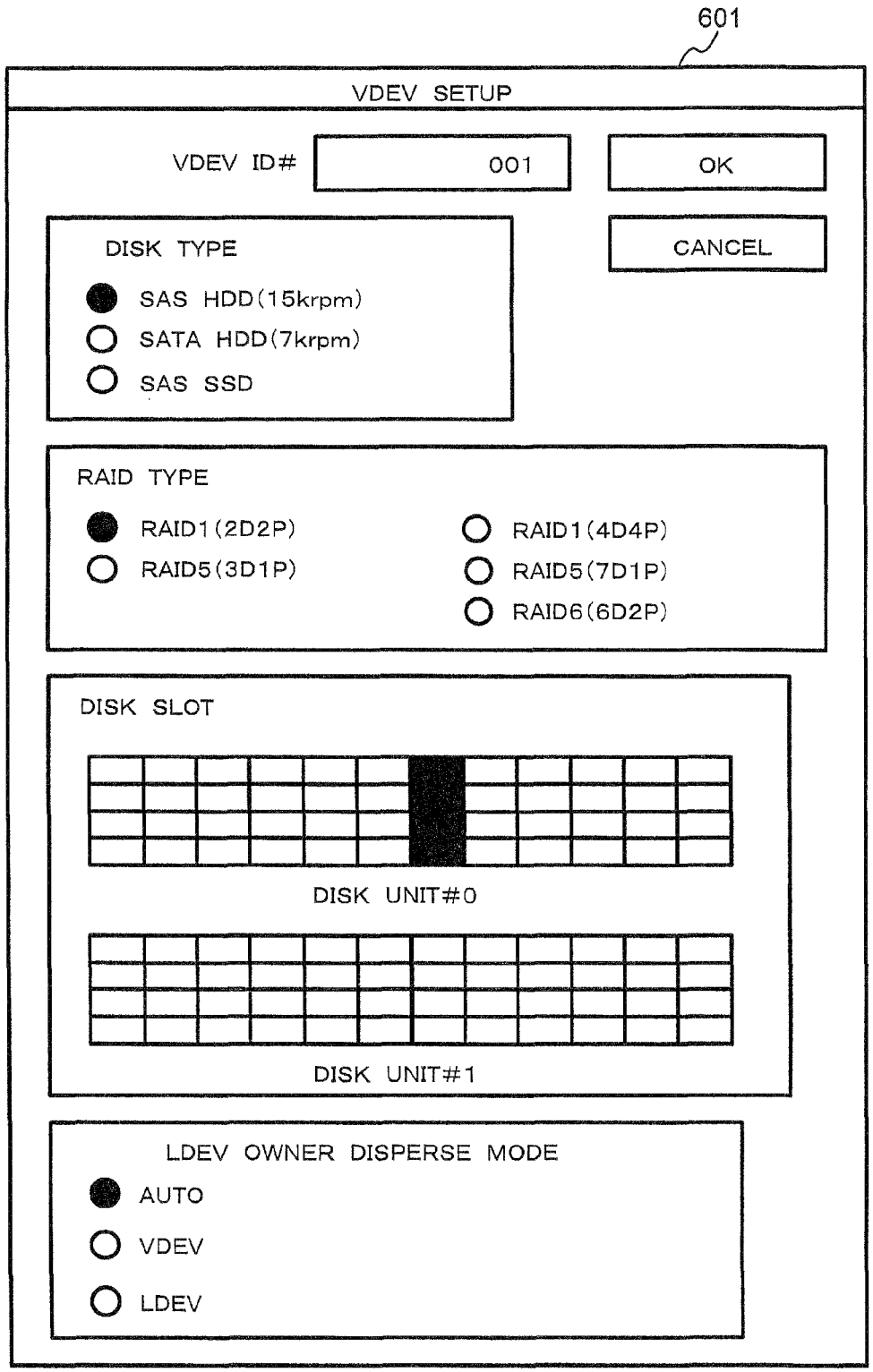
FIG. 6 shows a VDEV setup window 601.

This table 411 is set based on information inputted via the window 601 shown in FIG. 6.

FIG. 6 shows the VDEV setup window 601.

This window 601 is for inputting from the management computer 101 the various types of parameters in the VDEV table 403. The VDEV ID, disk type, RAID type, disk slot and disperse mode for the target VDEV are specified by the operator of the management computer 101 in this window 601.

The disk slot, for example, is specified as follows. That is, a plurality of cells corresponding to a plurality of slots in each disk unit is displayed in the window 601, and the cell corresponding to an operator-desired slot is specified. The RAID Group of the operator-specified RAID type is configured from disk drives (disk drives of the operator-desired disk type) inserted into slots corresponding to the cells specified by the operator, and the VDEV of the operator-specified VDEV ID is set based on this RAID Group.

Either "VDEV" or "LDEV" may be manually set as the disperse mode, and in addition thereto, "AUTO" may also set. In a case where the disperse mode "AUTO" has been set, either "VDEV" or "LDEV" is automatically set as the disperse mode in accordance with the VDEV setup processing program 403.

Figure 7:
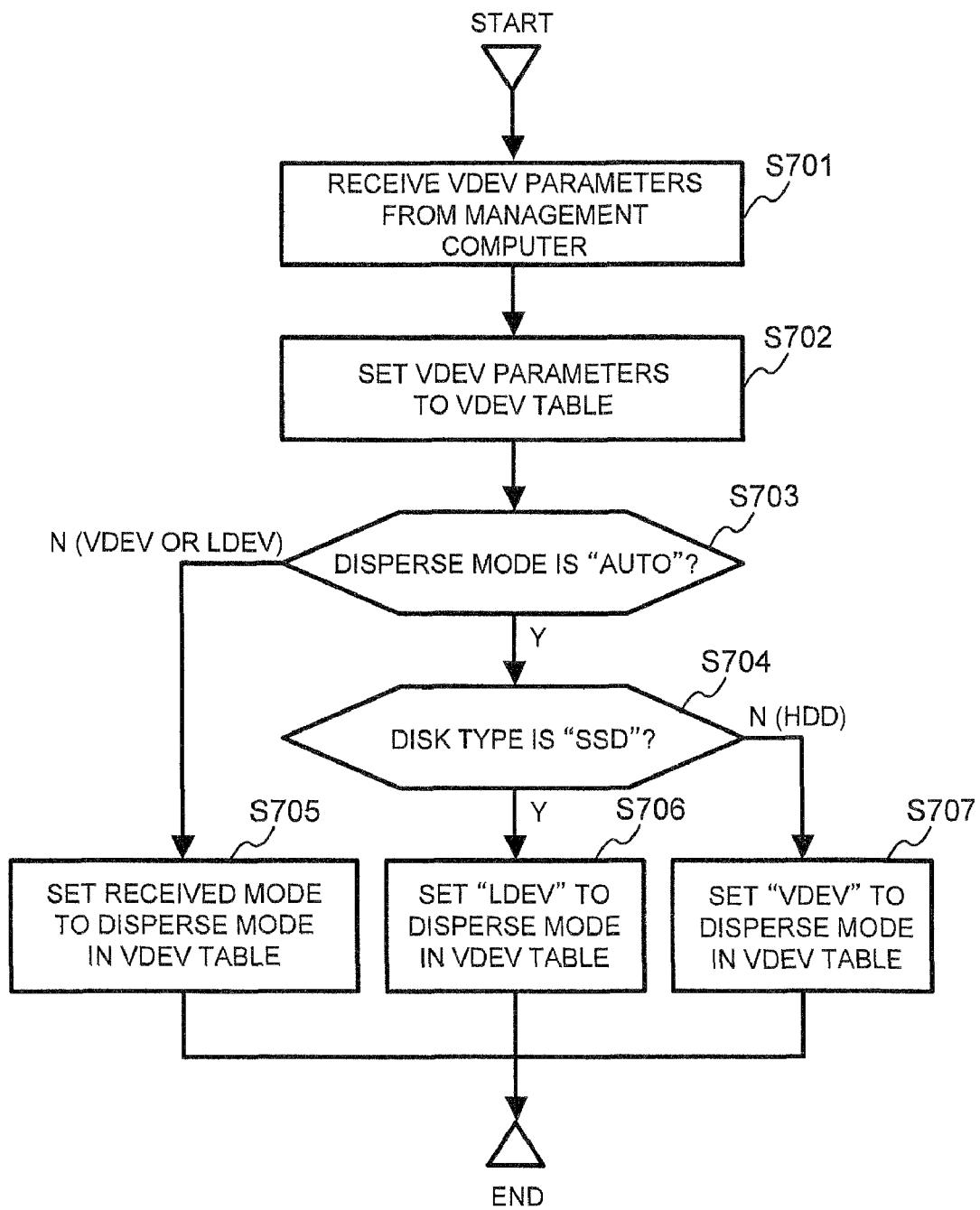
FIG. 7 shows the flow of VDEV setup processing.

FIG. 7 shows the flow of VDEV setup processing.

The VDEV setup processing program 403 receives from the management computer 101 the parameters (VDEV ID, disk type, RAID type, disk slot ID, disperse mode) inputted via the window 601 of FIG. 6 (S701).

The program 403 sets all of the received parameters except the disperse mode in the VDEV table 411 (S702).

The program 403 determines whether or not the disperse mode is "AUTO" (S703), and if the result of this determination is negative (S703: N), sets the received disperse mode value in the VDEV table 411 (S705).

If the result of the determination in S703 is affirmative (S703: Y), the program 403 determines whether or not the disk type is "SSD" (S704).

If the result of the determination in S704 is affirmative (S704: Y), the program 403 sets disperse mode "LDEV" in the VDEV table 411 (S706). This is because, in a case where the disk drive is SSD, the MP is more likely to become a performance bottleneck than the SSD, and setting the LDEV owner rights in LDEV units can be expected to solve for MP performance bottleneck.

Conversely, if the result of the determination in S704 is negative (S704: N), the program 403 sets the disperse mode "VDEV" in the VDEV table 411 (S707). This is because, in a case where the disk type is either SAS HDD or SATA HDD, HDD performance is susceptible to bottlenecks, and setting the LDEV owner rights in VDEV units can be expected to balance the load among the MP-PK.

Figure 8:
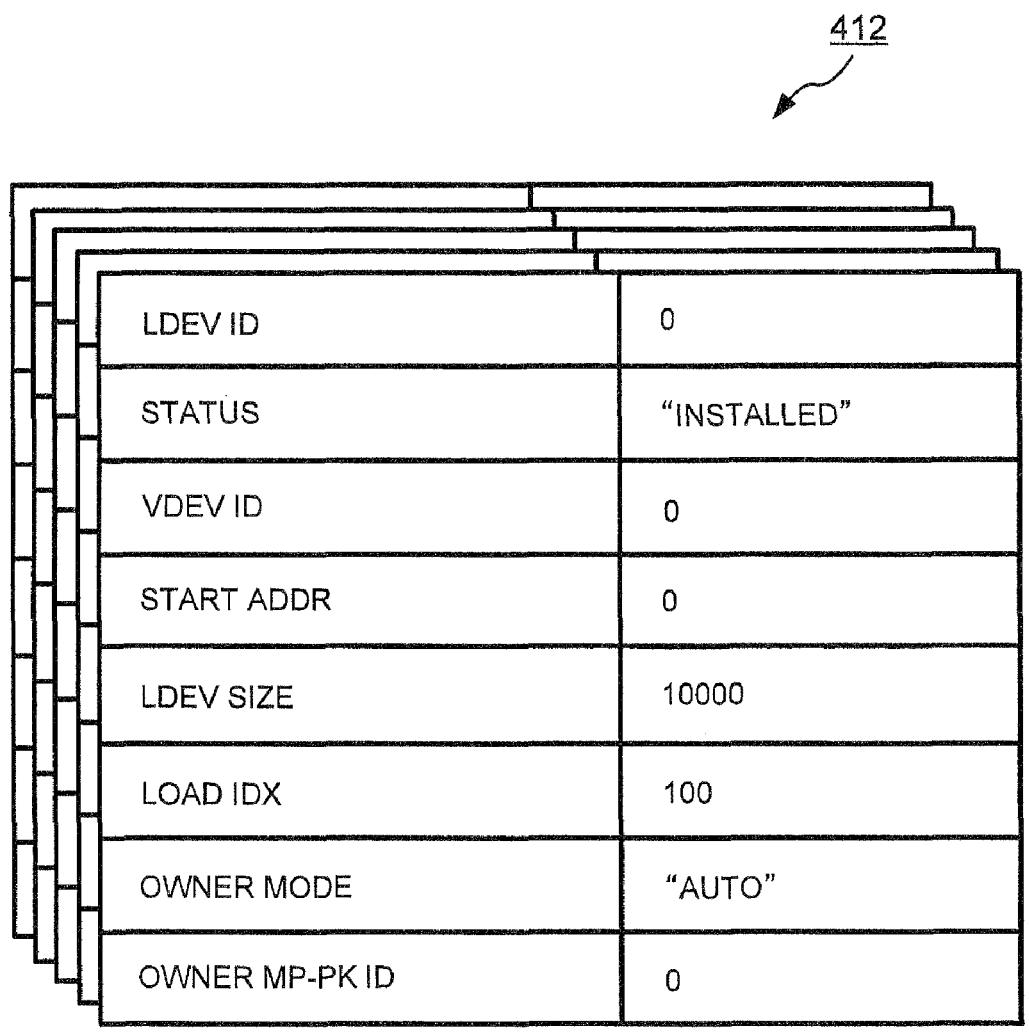
FIG. 8 shows the configuration of a LDEV table 412.

FIG. 8 shows the configuration of the LDEV table 412.

The LDEV table 412 has a LDEV ID, a status, a VDEV ID, a start address, a LDEV size, a LI (Load Index) owner mode, and an owner MP-PK ID for each LDEV. These elements will be explained hereinbelow by giving as an example one LDEV (hereinafter referred to as the "target LDEV" in the explanations of FIGS. 8 through 12 and FIG. 16).

The LDEV ID is the target LDEV identifier.

The status is the target LDEV status. Status values, for example, include "Installed", which is a state in which the target LDEV is mounted.

The VDEV ID is the identifier of the VDEV that constitutes the basis of the target LDEV.

The start address represents the address in the VDEV address space from where the target LDEV starts (in other words, the LDEV start location in the VDEV).

The LDEV size is the storage capacity of the target LDEV.

The owner mode shows the setting mode of the target LDEV owner right. The owner mode values, for example, include "AUTO" and "MANUAL". If the value is "AUTO", the owner MP-PK for the target LDEV is determined automatically in accordance with the owner setup processing program 407. If the value is "MANUAL", the MP-PK specified by the operator is the target LDEV owner MP-PK.

The owner MP-PK ID is the identifier of the MP-PK to which the target LDEV owner right has been assigned (in other words, the identifier of the MP-PK that carries out I/O processing for the target LDEV).

The LI is a value that determines the configuration for the LDEV, and is the load of the LDEV. In other words, the LI is the index for relatively comparing the maximum MP load with respect to processing an I/O command. The LI of the target LDEV may be determined on the basis of a variety of elements, but in this embodiment, it is determined on the basis of the following three elements:

(E1) the RAID level of the VDEV that constitutes the basis of the target LDEV;

(E2) the disk type of the VDEV that constitutes the basis of the target LDEV; and (E3) the number of LDEV of one VDEV that constitutes the basis of the target LDEV. For example, the value of the LI determined in accordance with the elements (E1) and (E2) is computed by dividing by the element (E3). Specifically, for example, in a case where the access pattern is read:write=1:1, and the cache hit rate is 50%, the target LDEV LI may be calculated by carrying out computations using the Formula (1) below:

$$LI=\text{(average time per I/O process(time required by } MP))\times\text{(drive performance)}\times\text{(number of disk drives serving as the basis for the } VDEV)/\text{(average number of drive accesses per I/O process)}/\text{(number of LDEV included in VDEV that constitutes the basis of the target } LDEV) \quad (1)$$

A "cache hit" refers to finding the data targeted by a write or a read when accessing the cache memory 216. The "cache hit rate" is the probability of a cache hit.

The "drive performance", for example, is represented by the number of I/O commands that the disk drive is capable of processing per unit of time (IOPS), or the number of disk revolutions for unit of time (rpm).

For example, in a case where the RAID type of the VDEV is RAID-5, the (average time per I/O process (time required by MP)) and the (average number of drive accesses per I/O process) required for processing in accordance with parity creation and for disk access are larger than a VDEV with a RAID type of RAID-1. In other words, these values will differ in accordance with the RAID type.

Accordingly, using a LI computation table like that shown in FIG. 16, the LI may be calculated by carrying out computations Formula (2) below:

$$LI=\text{(value described in computation table)}/\text{(number of } LDEV \text{ included in } VDEV \text{ that constitutes the basis of target } LDEV). \quad (2)$$

Figure 16:
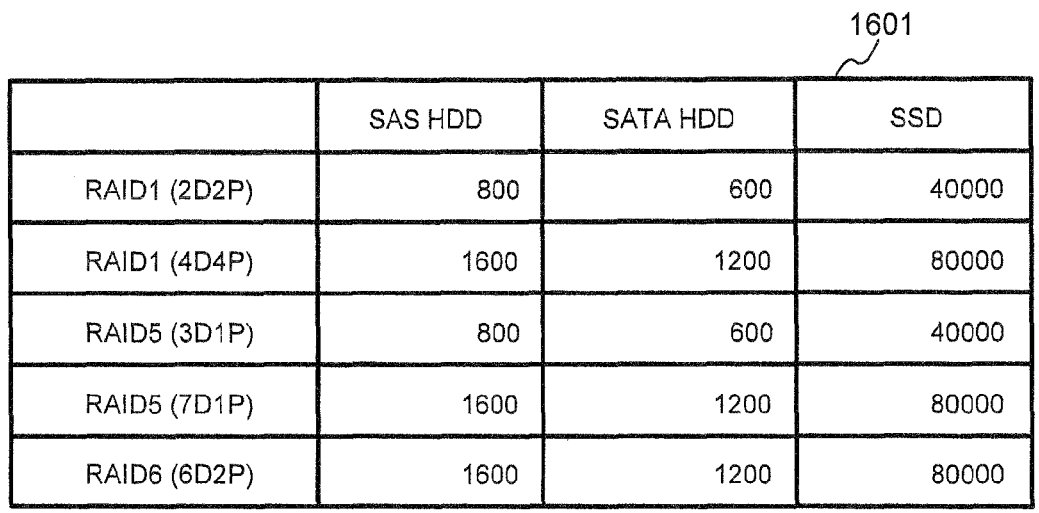
FIG. 16 shows a LI computation table.

The LI computation table shown in FIG. 16 shows the VDEV LI in accordance with the RAID type and the disk type.

The respective numeric values in the LI computation table may be experiential values determined by a person, but may be approximately computed as follows.

That is, if it is supposed that the access pattern is read:write=1:1, the relationship to the number of disk drive accesses by RAID type is as shown below:

(RAID-1) one read access and two write accesses for a total of three accesses;

(RAID-5) one read access and three write accesses for a total of four accesses; and (RAID-6) one read access and five write accesses for a total of six accesses. The MP processing time is substantially proportional to the number of disk drive accesses. Accordingly, the two are considered to offset one another. For this reason, the LI for the entire VDEV is computed using (drive performance)×(number of drives per VDEV). In the example of FIG. 16, the drive performance of an SAS HDD is 200 TOPS, the drive performance of a SATA HDD is 150 IOPS, and the drive performance of a SSD is 10000 IOPS. For this reason, according to FIG. 16, for RAID type "RAID1 (2D2P)", the LI of the VDEV is 800 (200 IOPS×4) for disk type "SAS HDD", the LI of the VDEV is 600 (150 IOPS×4) for disk type "SATA HDD", and the LI of the VDEV is 40000 (10000 TOPS×4) for disk type "SSD".

Figure 9:
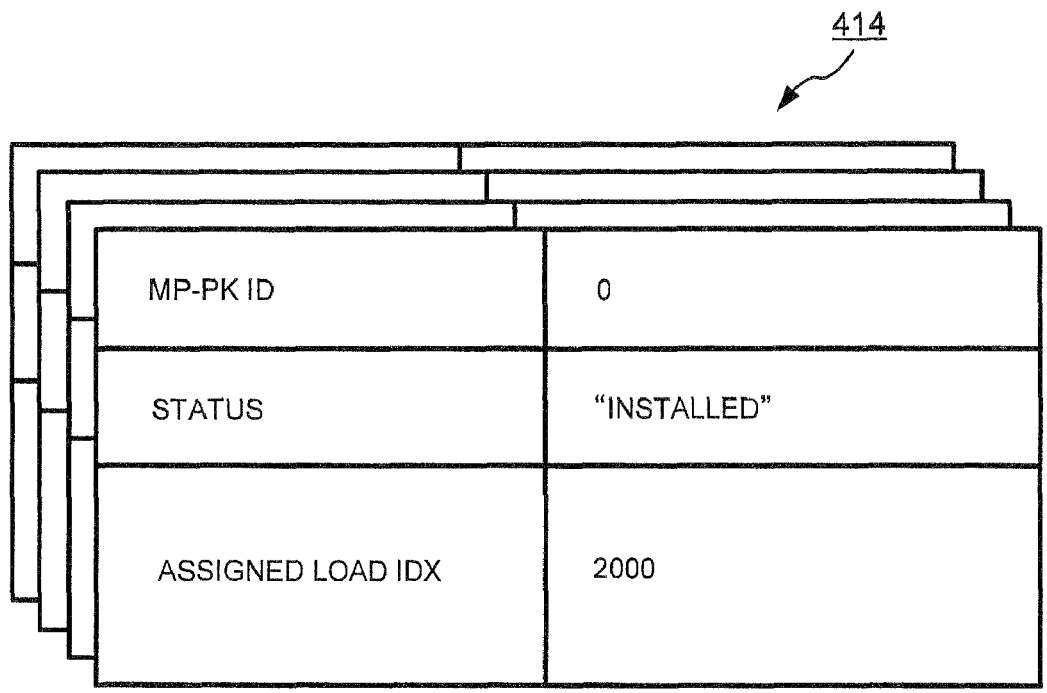
FIG. 9 shows the configuration of a MP-PK table 414.

FIG. 9 shows the configuration of the MP-PK table 414.

The MP-PK table 414 has a MP-PK ID, a status and an ALI (Assigned Load Index) for each MP-PK. These elements will be explained hereinbelow by giving one MP-PK (hereinafter referred to as the "target MP-PK" in the explanations of FIGS. 9 through 12) as an example.

The MP-PK ID is the MP-PK identifier.

The status is the status of the target MP-PK. The status values, for example, include "Installed", which is the state in which the target MP-PK is mounted, and "Not-Installed", which is the state in which the target MP-PK is not mounted.

The ALI is the sum total of the LDEV LI corresponding to all the owner rights that have been assigned.

In a case where the target MP-PK is mounted, the MP-PK setup processing program 405 changes the status of the target MP-PK from "Not-Installed" to "Installed", and sets "0" as the ALI of the target MP-PK.

FIG. 10 shows the LDEV setup window 1001.

This window 1001 is for inputting the ID of the VDEV that constitutes the basis of the target LDEV, the reference ID (for example, the start ID) of the LDEV created based on this VDEV, and the number of LDEV (LDEV NUM) created based on this VDEV. An ID that has a reference ID as a reference (for example, a start) is set as the ID for each LDEV. The ID of the target LDEV owner MP-PK is also able to be set in this window 1001. In a case where "AUTO" is specified as the ID for the target LDEV owner MP-PK, the owner MP-PK is determined automatically.

Figure 11:
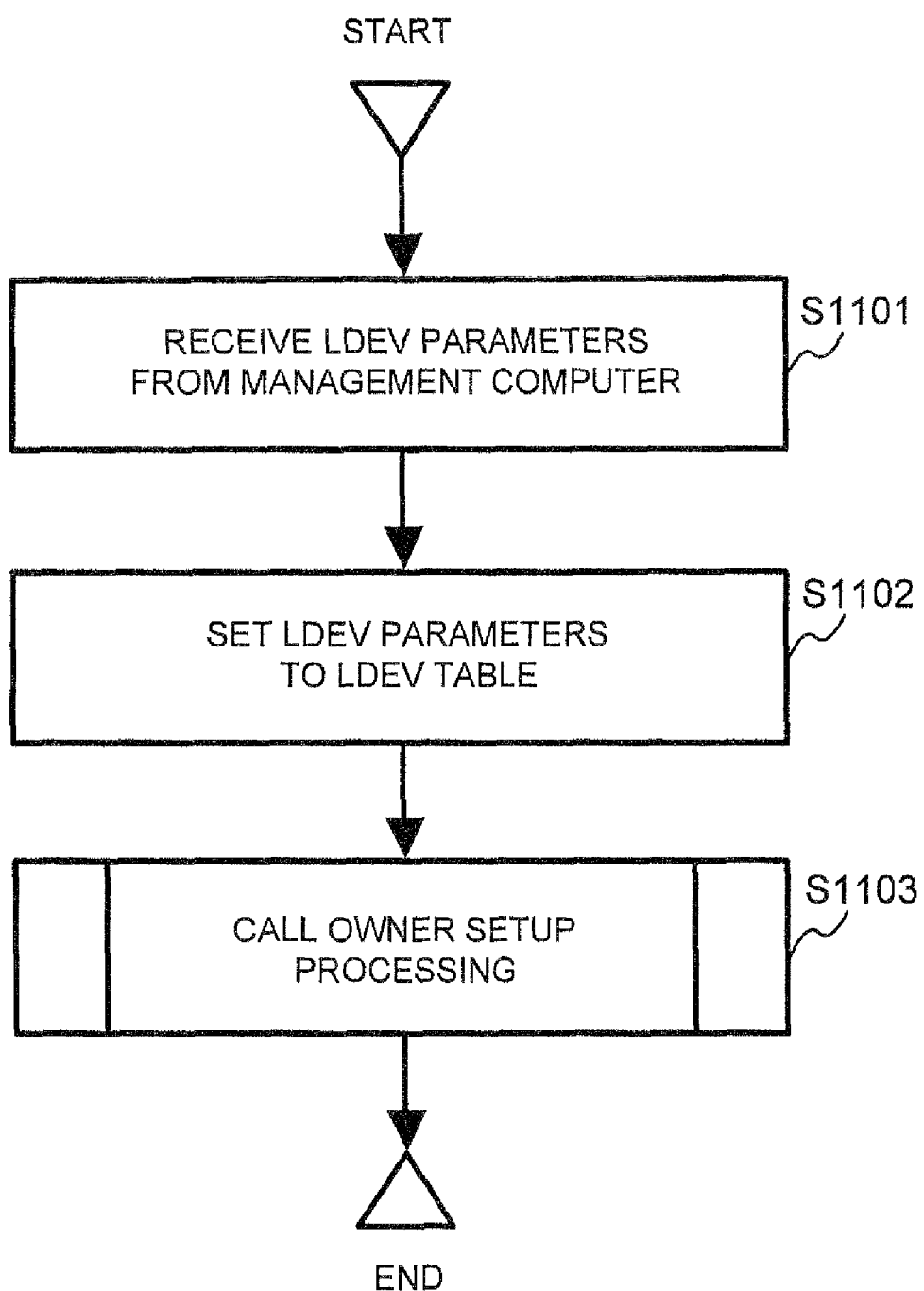
FIG. 11 shows the flow of LDEV setup processing.

FIG. 11 shows the flow of LDEV setup processing.

The LDEV setup processing program 404 receives from the management computer 101 the parameters (VDEV ID, LDEV ID, number of LDEV, owner MP-PK ID for each LDEV) that have been inputted via the window 1001 of FIG. 10 (S1101).

The program 404 sets all of the received parameters except the owner MP-PK ID in the LDEV table 412 (S1102).

Then the program 404 calls the owner setup processing program 407 (S1103).

Figure 12:
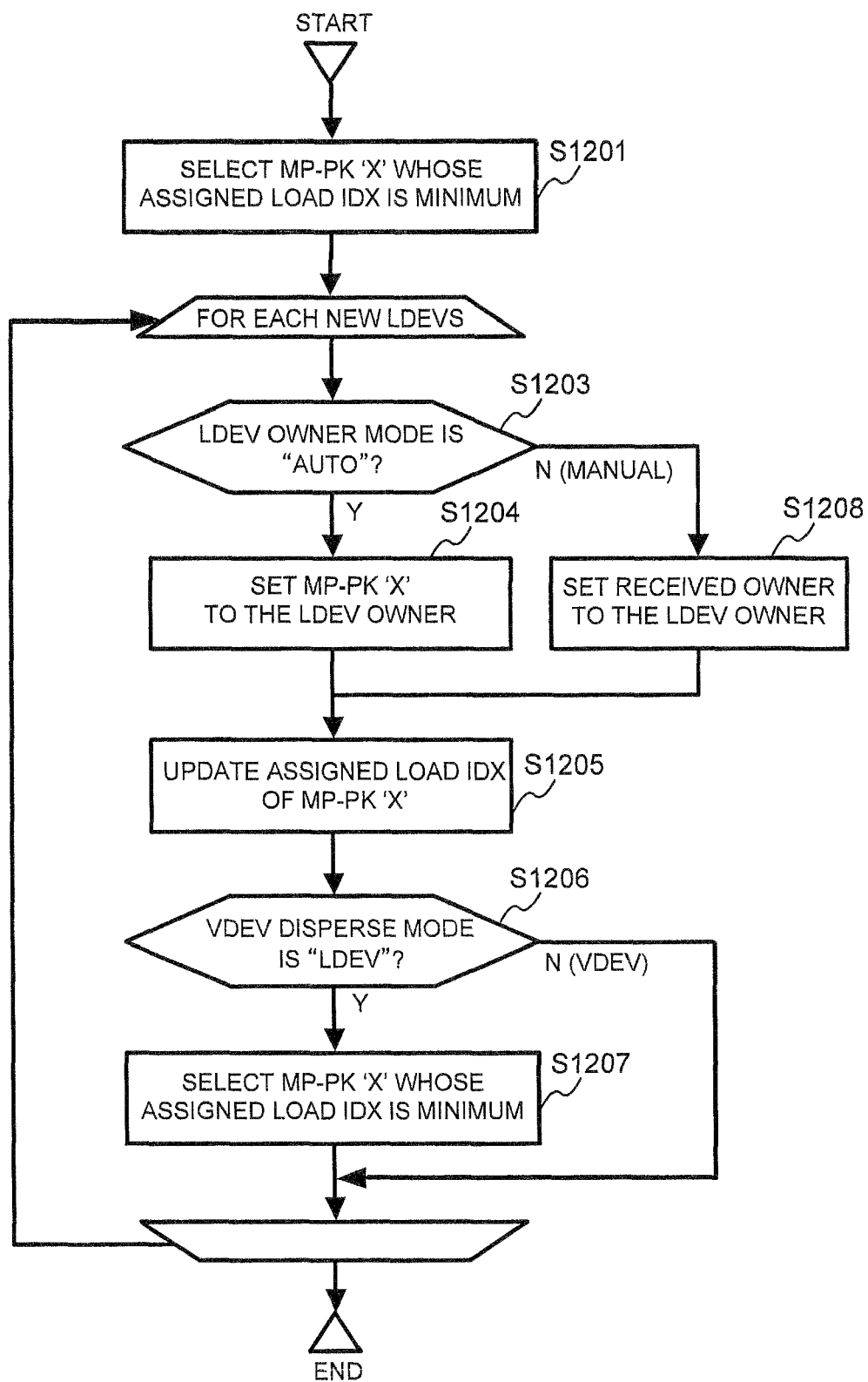
FIG. 12 shows the flow of owner setup processing.

FIG. 12 shows the flow of owner setup processing.

The owner setup processing program 407 references the MP-PK table 414, and selects the MP-PK having the smallest ALI (hereinafter, MP-PK "X") (S1201). Then, the owner setup processing program 407 carries out the following S1203 through S1207 for each target LDEV specified via window 1001.

In S1203, the program 407 determines whether or not target LDEV owner mode is "AUTO". If the result of this determination is affirmative (S1203: Y), S1204 is carried out, but if the result of this determination is negative (S1203: N), S1208 is carried out.

In S1204, the program 407 sets the ID of MP-PK "X" in the LDEV table 412 as the target LDEV owner MP-PK ID.

In S1205, the program 407 adds the LI of the target LDEV to the ALI of the target LDEV owner MP-PK.

In S1206, the program 407 determines whether or not the disperse mode of the VDEV having the target LDEV (the VDEV identified from the VDEV ID specified in window 1001) is "LDEV". If the result of this determination is affirmative (S1206: Y), S1207 is carried out, but if the result of this determination is negative (S1206: N), S1207 is skipped.

In S1207, the program 407 references the MP-PK table 414 and selects MP-PK "X", which has the smallest ALI. The MP-PK "X" that is selected here may differs from the MP-PK "X" that was selected in S1201. This is because the ALI of the MP-PK "X" selected in S1201 is updated in S1205, and there is the possibility that the ALI of the MP-PK "X" selected in S1201 will exceed the ALI of the other MP-PK. That is, in a case where the disperse mode is "LDEV", the MP-PK "X", which has the smallest ALI, is reselected each time the owner right is assigned to a target LDEV.

In S1208, the program 407 sets the MP-PK ID inputted via window 1001 in the LDEV table 412 as the owner MP-PK ID of the target LDEV.

FIG. 13 shows the configuration of the routing table 415 (and the LU-path table 413).

The routing table 415 (and the LU-path table 413) has an FE port ID, a LUN, a LDEV ID, and an owner MP-PK ID for each FE port 112. These elements will be explained hereinbelow by giving one FE port (hereinafter referred to as the "target FE port" in the explanations of FIGS. 13 through 15) as an example.

The FE port ID is the target FE port identifier (the abovementioned port number).

The LUN is the number of the LU associated to the target FE port.

The LDEV ID is the identifier of the LDEV associated to the LUN that corresponds to the target FE port.

The owner MP-PK ID is the identifier of the MP-PK to which the owner right for the LDEV corresponding to the target FE port has been assigned.

FIG. 4 shows an LU setup window 1401.

This window 1401 is for inputting from the management computer 101 various parameters of the routing table 415 (and the LU-path table 413). In this window 1401, the FE port ID, the LUN associated to the FE port, and the LDEV ID associated to this LUN is specified for the target FE port by the operator of the management computer 101.

Figure 15:
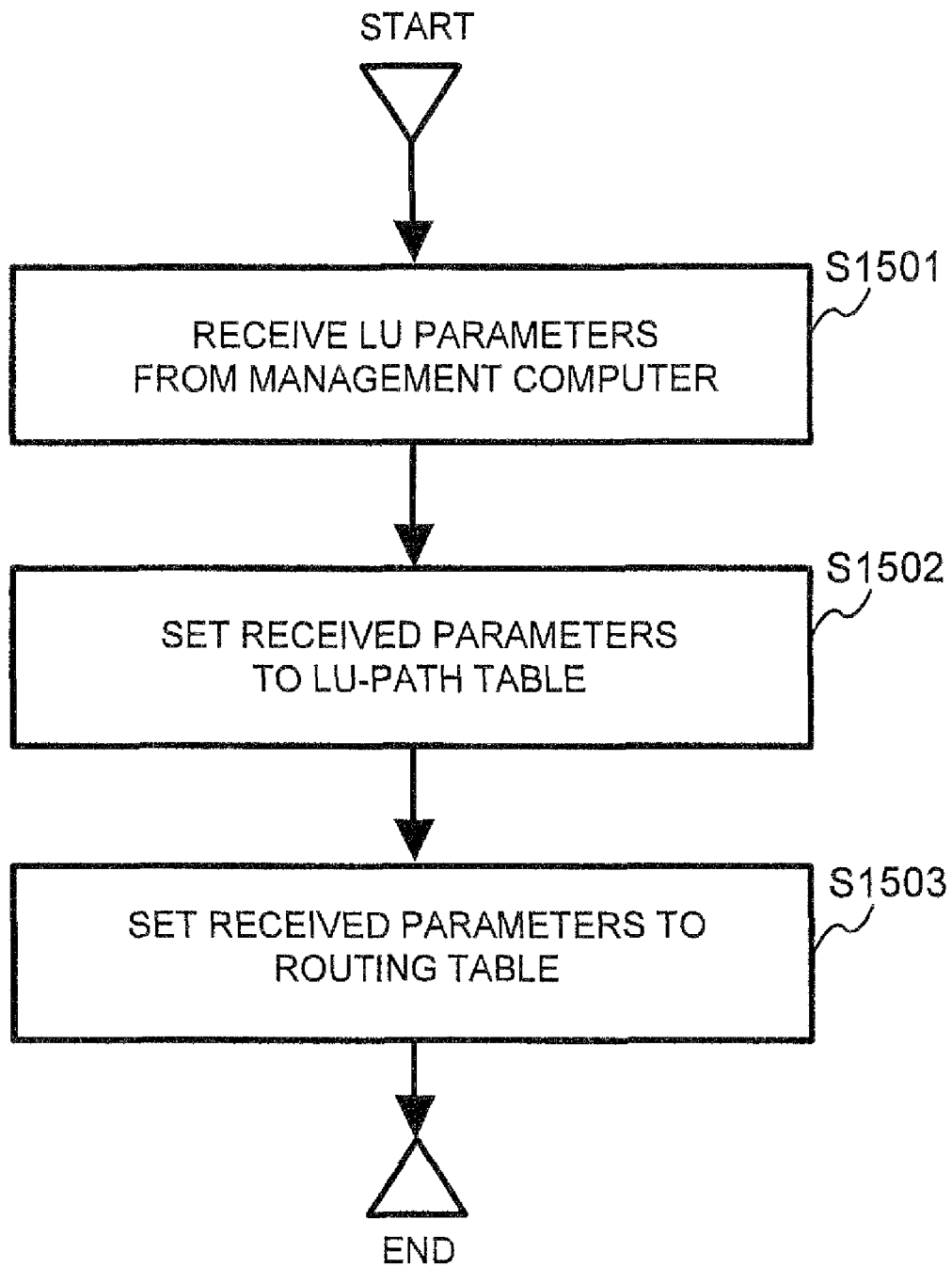
FIG. 15 shows the flow of LU setup processing.

FIG. 15 shows the flow of LU setup processing.

Figure 14:
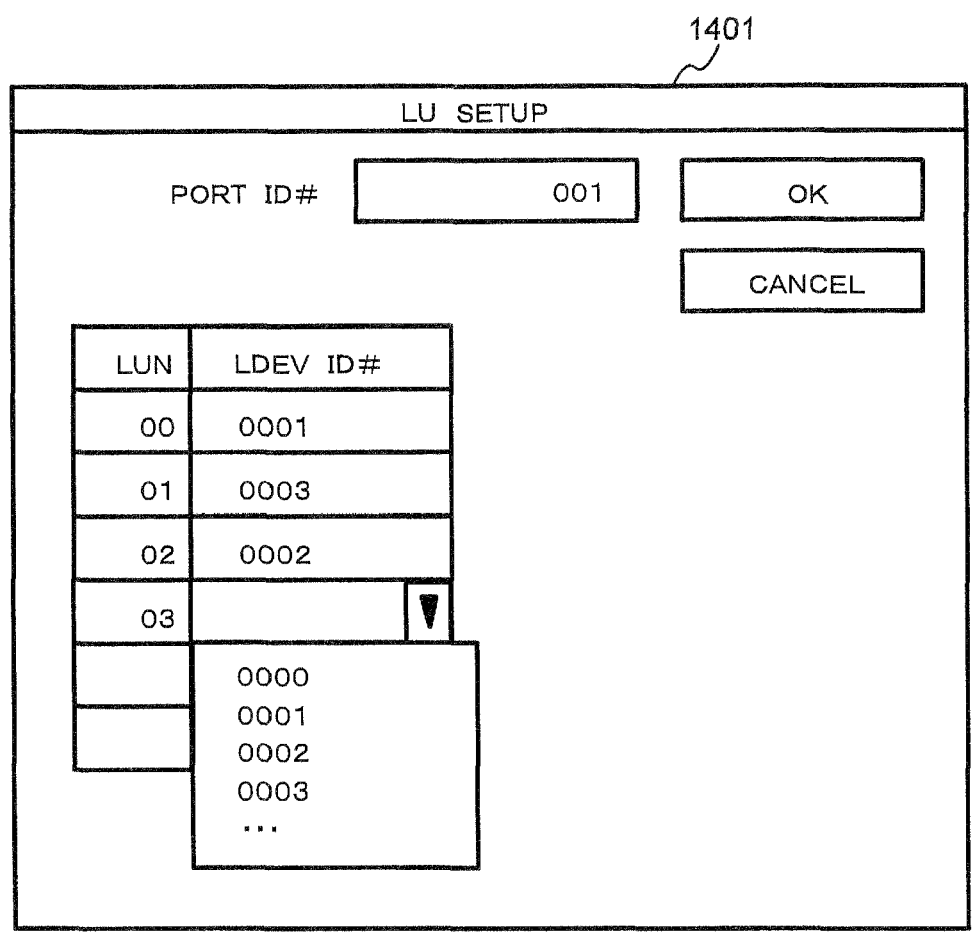
FIG. 14 shows a LU setup window 1401.

The LU setup processing program 406 receives from the management computer 101 the parameters (FE port ID, LUN, LDEV ID) inputted via the window 1401 of FIG. 14 (S1501).

The program 406 sets the received parameters in the LU-path table 413 (S1502).

The program 406 also sets the received parameters in the routing table 415 (S1502).

Figure 17:
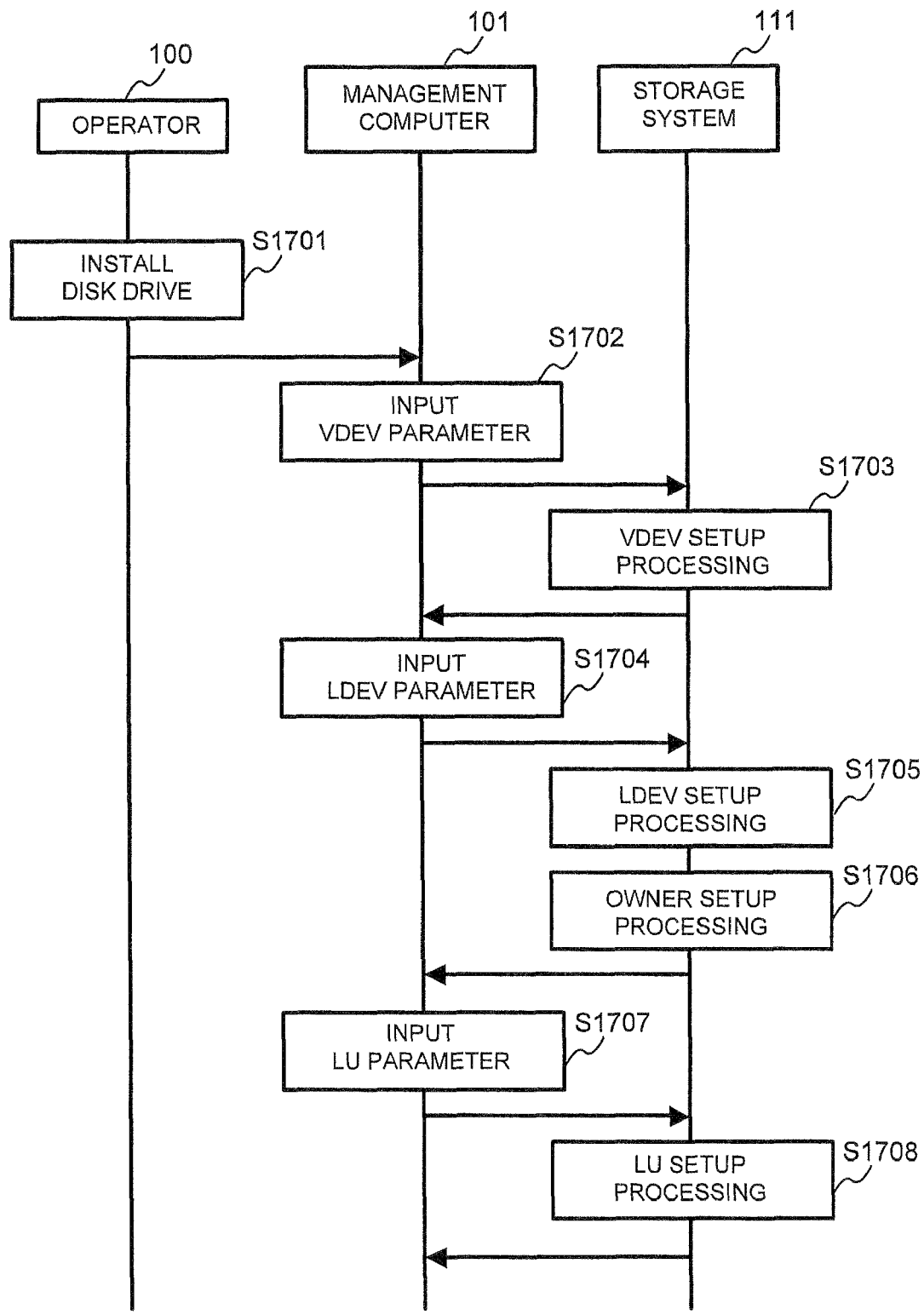
FIG. 17 shows the overall flow for LDEV augmentation.

FIG. 17 shows the overall flow of LDEV augmentation.

The operator 100 adds either one or a plurality of disk drives 218 (for example, a RAID Group) to the storage system 111 (S1701). S1701 does not necessarily have to be carried out if there is a surplus of disk drives 218.

The management computer 101 displays the VDEV setup window 601 (Refer to FIG. 6), and receives the input of parameters from the operator (S1702). The management computer 101 sends the inputted parameters to the storage system 111.

The VDEV setup processing program 403 carries out the VDEV setup process (Refer to FIG. 7) (S1703). As mentioned hereinabove, if the disperse mode inputted as a parameter is "AUTO" and the VDEV disk type is SSD here, "LDEV" is set as the disperse mode in the VDEV table 412. Conversely, if the disperse mode inputted as a parameter is "AUTO" and the VDEV disk type is other than SSD (either a SATA HDD or a SAS HDD), "VDEV" is set as the disperse mode in the VDEV table 412.

The management computer 101 displays the LDEV setup window 1001 (Refer to FIG. 10), and receives the input of parameters from the operator (S1704). The management computer 101 sends the inputted parameters to the storage system 111.

The LDEV setup processing program 404 performs the LDEV setup process (Refer to FIG. 11) (S1705). In this process, as mentioned hereinabove, the LDEV setup processing program 404 calls the owner setup processing program 407.

The owner setup processing program 407 performs the owner setup process (Refer to FIG. 12) (S1706). In this process, the owner right for the added LDEV is assigned to the MP-PK having the smallest ALI. If the diverse mode of the VDEV (the newly set VDEV) having the added LDEV is "VDEV", the owner rights for all the LDEV included in this VDEV are assigned to the MP-PK with the lowest ALI at the time the owner setup process starts. Conversely, if the diverse mode of this VDEV is "LDEV", the owner right of one LDEV inside this VDEV is assigned to the MP-PK with the lowest ALI, and the lowest ALI MP-PK is reselected each time the ALI of this MP-PK is updated (each time the LI of the LDEV is added to this ALI).

The management computer 101 displays the LU setup window 1401 (Refer to FIG. 14), and receives the input of parameters from the operator (S1707). The management computer 101 sends the inputted parameters to the storage system 111.

The LU setup processing program 406 performs the LU setup process (Refer to FIG. 15) (S1708).

According to the first embodiment of the present invention above, immediately after a LDEV has been added, that is, immediately after a configuration change, this LDEV is assigned to the MP-PK with the lowest ALI. For this reason, operation in a state in which load balancing has been completed is possible immediately after a configuration change. In other words, it is possible to prevent adverse affects on the I/O performance of the storage system 111 since load balancing among MP-PK is completed in a period of time (for example, during maintenance) other than during the operation of the storage system 111 (other than during the period when an I/O command received from the host is being processed).

Mode for the Invention 2

A second embodiment of the present invention will be explained below. The points of difference with the first embodiment will mainly be explained at this time, and the points shared on common with the first embodiment will either be simplified or omitted (The same will hold true for a third embodiment explained further below).

Figure 18:
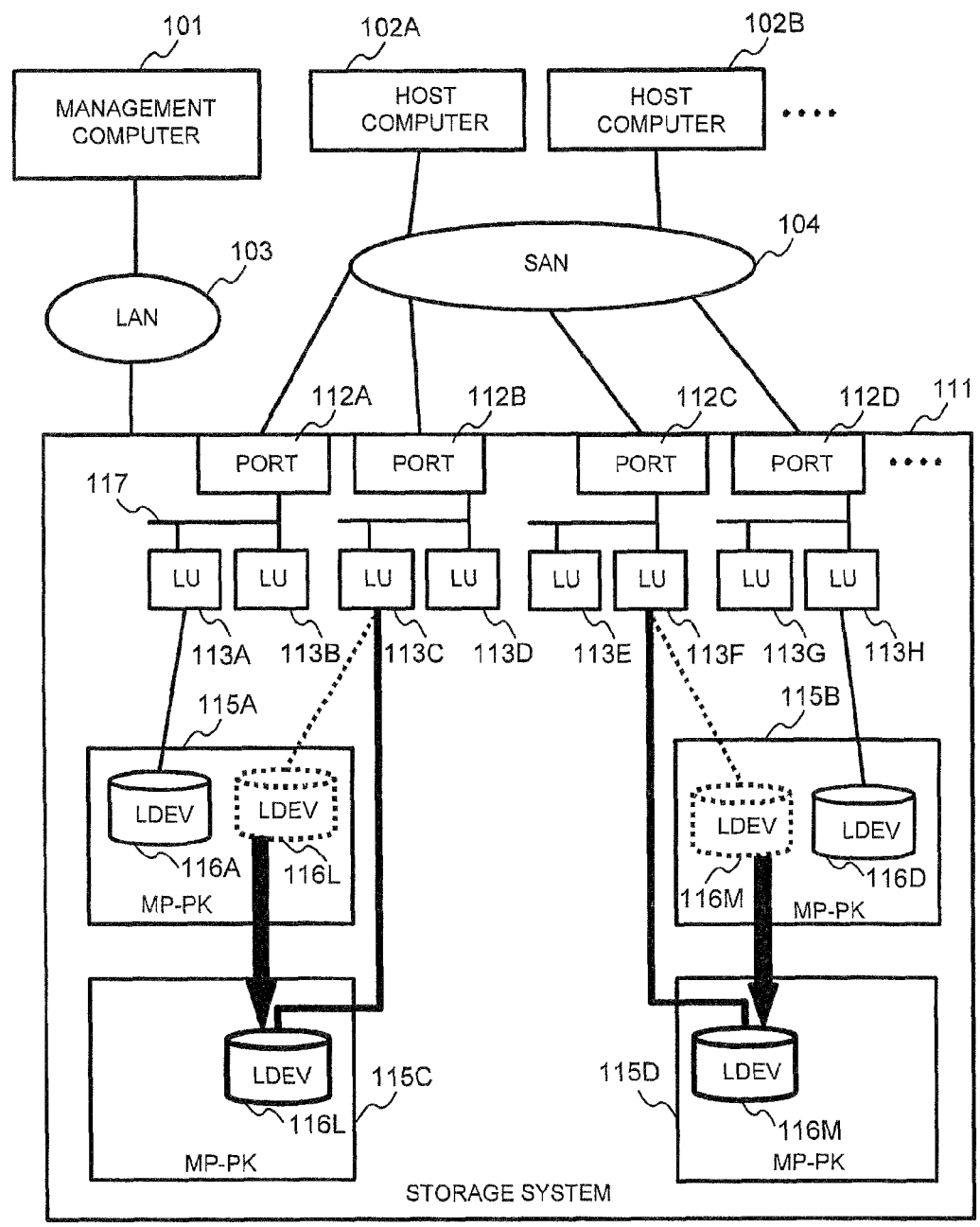
FIG. 18 shows an overview of a second embodiment of the present invention.

FIG. 18 shows an overview of the second embodiment of the present invention.

In this embodiment, the LDEV owner right is changed (rebalanced) when an MP-PK is added. Specifically, for example, it is supposed that MP-PK 115C and 115D have been added as shown in FIG. 18. In this case, the owner right for LDEV 116L changes from MP-PK 115A to MP-PK 115C, and the owner right for LDEV 116M changes from MP-PK 115B to MP-PK 115D. That is, upon the addition of an MP-PK 115, the loads of the plurality of MP-PK that includes the added MP-PK are balanced.

Figure 19:
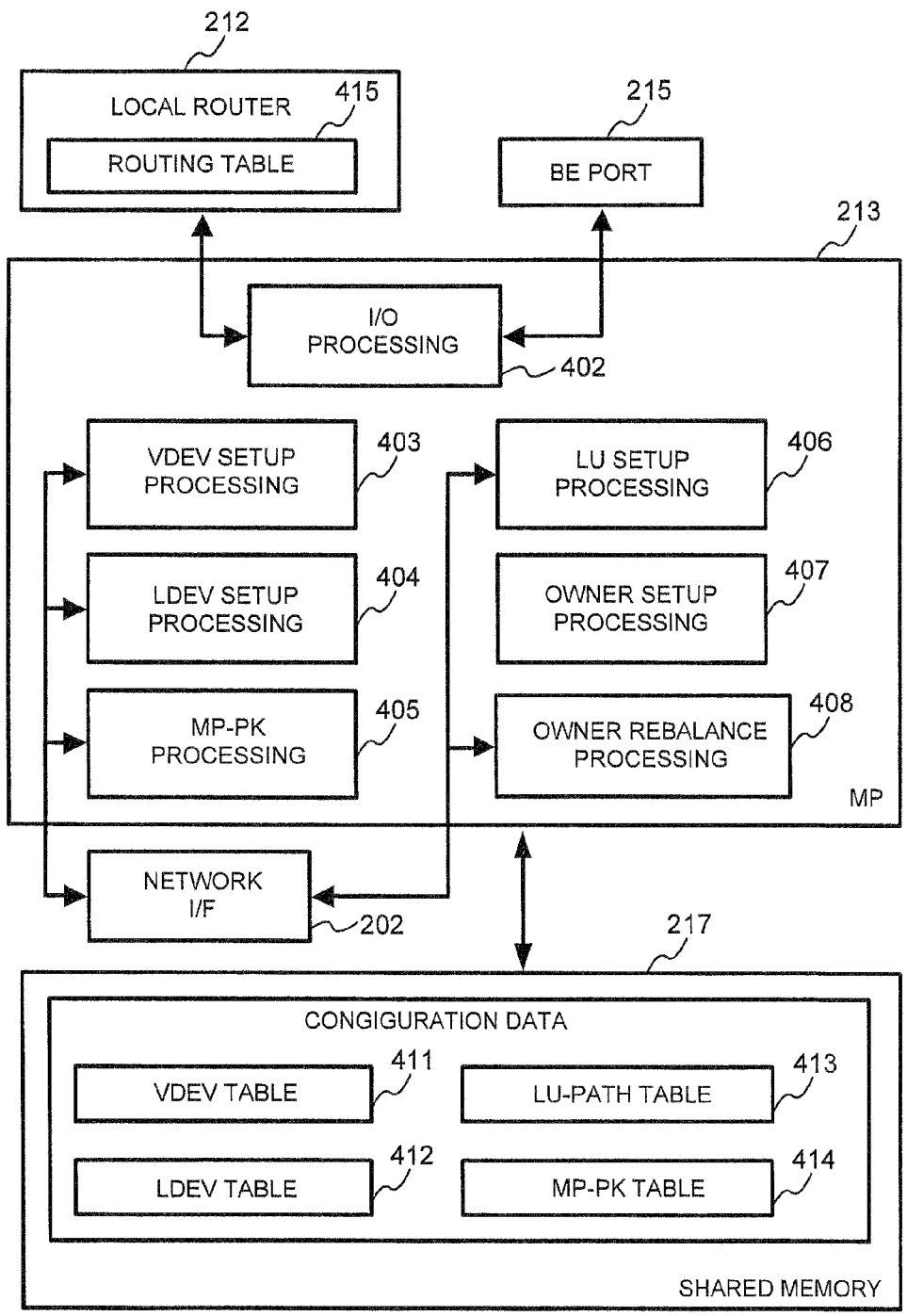
FIG. 19 shows computer programs that are executed by MP 213 in the second embodiment.

FIG. 19 shows the computer programs executed by MP 213 in the second embodiment.

In MP 213, the owner rebalance processing program 408 is executed. The owner rebalance processing program 408 rebalances (changes) the LDEV owner rights such that the ALI of the plurality of MP-PK including the added MP-PK are made uniform.

Figure 20:
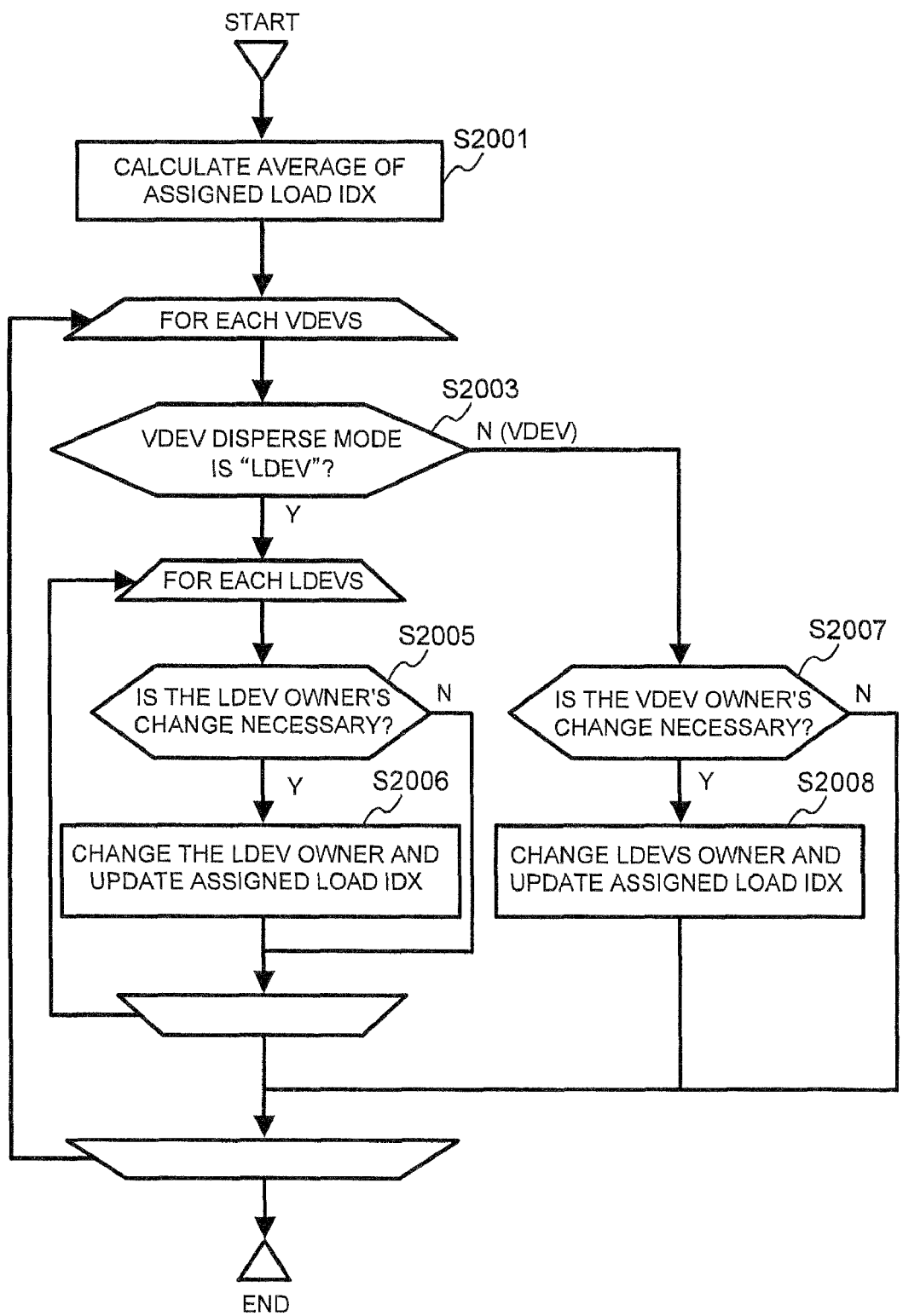
FIG. 20 shows the flow of owner rebalance processing.

FIG. 20 shows the flow of owner rebalance processing.

The owner rebalance processing program 408 references the MP-PK table 414 and computes the average value of the ALI of the plurality of MP-PK including the added MP-PK (S2001). As used here, the computed average value is the target value used at owner rebalancing. The target value may also be another value besides an average value.

S2003 through S2008 are carried out for all the VDEV managed by the storage system 1801. S2003 through S2008 will be explained by giving as an example one certain VDEV (hereinafter referred to as the "target VDEV" in the explanation of FIG. 20).

In S2003, the program 408 references the VDEV table 411 and determines whether or not the disperse mode of the target VDEV is "LDEV". If the result of this determination is affirmative (S2003: Y), S2005 and S2006 are carried out for each LDEV inside the target VDEV. Conversely, if the result of this determination is negative (S2003: N), S2007 is carried out.

In S2005, the program 408 determines whether or not the owner rights for the LDEV being targeted inside the target VDEV need to be changed. Specifically, for example, the owner rebalance processing program 408 determines that a change of owner rights is required if both of the following conditions, i.e. (H1) and (H2), are maintained when the target LDEV owner right moves to the MP-PK with the lowest ALI (that is, if the result of the determination of S2005 is affirmative):

(H1) The ALI "P" of the current owner MP-PK for the target LDEV is greater than the average value "AVE" computed in Step S2001 (that is, the value remaining after subtracting the LI of the target LDEV from the ALI "P" is greater than the average value "AVE");

(H2) The ALI "Q" of the MP-PK with the lowest ALI is less than the average value "AVE" computed in Step S2001 (that is, the sum of the target LDEV LI and the ALI "Q" is less than the average value "AVE"). In other words, if either one of (H1) and (H2) is not satisfied, a change of owner rights is determined unnecessary (That is, the result of the determination of S2005 is negative). Consequently, it is possible to prevent LDEV owner rights from being changed more than necessary, thereby making it possible to curb a drop in performance.

When the result of the determination of S2005 is affirmative (S2005: Y), S2006 is carried out, and when the result of the determination of S2005 is negative (S2005: N), S2006 is skipped, and S2005 is carried out once again for a different LDEV.

In S2006, the program 408 changes the target LDEV owner right to the MP-PK with the lowest ALI, and updates the ALI "P" of the change-source MP-PK (that is, the post-update ALI=ALI "P"−(target LDEV LI)) and updates the ALI "Q" of the change-destination MP-PK (that is, the post-update ALI=ALI "Q"+(target LDEV LI)).

In S2007, the program 408 determines whether or not it is necessary to change the owner rights for all the LDEV inside the target VDEV. Specifically, for example, the owner rebalance processing program 408 determines that a change of owner rights is required if both of the following conditions, i.e. (h1) and (h2), are maintained when the owner rights of all the LDEV inside the target VDEV move to the MP-PK with the lowest ALI (that is, if the result of the determination of S2007 is affirmative):

(h1) The ALI "p" of the current owner MP-PK for all the LDEV inside the target VDEV are greater than the average value "AVE" computed in Step S2001 (that is, the value remaining after subtracting the sum "k" of the LI of all LDEV inside the target VDEV from the ALI "p" is greater than the average value "AVE");

(H2) The ALI "q" of MP-PK with the lowest ALI is less than the average value "AVE" computed in Step S2001 (that is, the sum of the above-mentioned value "k" and the ALI "q" is less than the average value "AVE"). In other words, if either one of (h1) and (h2) is not satisfied, a change of owner rights is determined unnecessary (That is, the result of the determination of S2007 is negative). Consequently, it is possible to prevent LDEV owner rights from being changed more than necessary, thereby making it possible to curb a drop in performance.

When the result of the determination of S2007 is affirmative (S2007: Y), S2008 is carried out, and when the result of the determination of S2007 is negative (S2007: N), S2008 is skipped.

In S2008, the program 408 changes the owner rights of all the LDEV inside the target VDEV to the MP-PK with the lowest ALI, and updates the ALI "p" of the change-source MP-PK (that is, the post-update ALI=ALI "p"–the above-mentioned value "k") and updates the ALI "q" of the change-destination MP-PK (that is, the post-update ALI=ALI "q"+ the above-mentioned value "k").

In S2006 and S2008, in a case where the LDEV owner mode is "MANUAL", the LDEV owner rights change is not performed.

Figure 21:
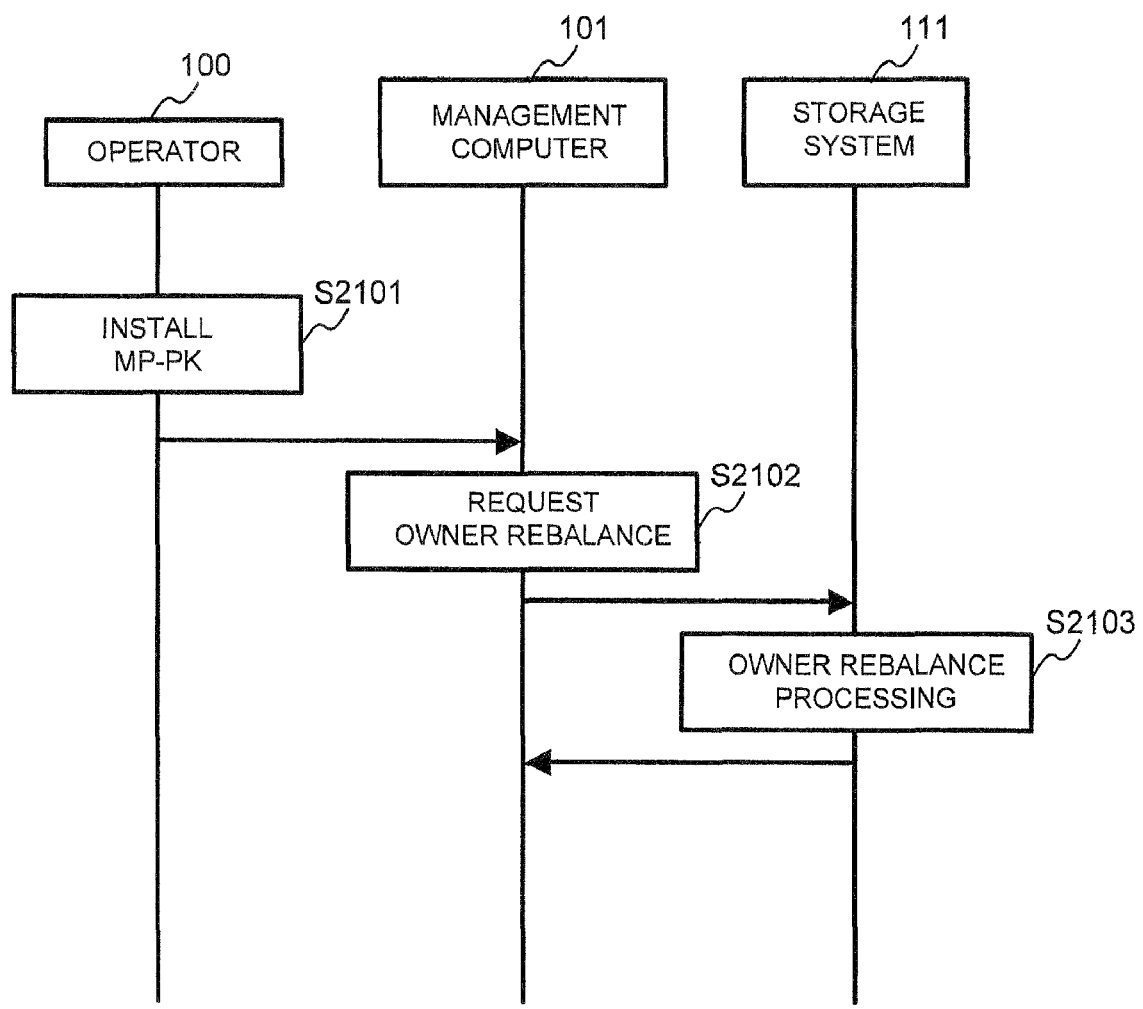
FIG. 21 shows the overall flow for MP-PK augmentation.

FIG. 21 shows the overall flow of MP-PK augmentation.

The operator 100 adds either one or a plurality of MP-PK 115 to the storage system 1801 (S2101).

The management computer 101 request the storage system 1801 for an owner rebalance (S2102).

The owner rebalance processing program 408 carries out owner rebalance processing (refer to FIG. 20) in response to this request.

The preceding is an explanation of the second embodiment of the present invention. Furthermore, owner rebalance processing is not limited to the addition of MP-PK. For example, this processing may also be carried out when deleting a LDEV. However, in the case of an event (load reducing event) in which the overall load on the storage system 1801 is carried out, such as the deletion of a LDEV, owner rebalance processing need not be carried out immediately after this event. For example, after a load reducing event has been carried out, owner rebalance processing need not be carried out until a predetermined event has been detected. The predetermined event, for example, is at least one of the following events (A) through (C):

(A) An owner rebalance instruction has been received from the operator via the management computer 101;

(B) The load of the entire storage system 1801 has become less than a predetermined value; and (C) The present time exceeds a certain time (for example, it is night time). The reason why owner rebalance processing is not carried out immediately after the load reducing event is because it is considered more desirable to curb temporary drops in performance in line with changes of LDEV owner rights than to balance the load among the MP-PK.

According to the second embodiment of the present invention, owner rebalance processing is carried out immediately after a configuration change such as the addition of an MP-PK. If the owner rebalance processing of immediately after the configuration change is completed during a maintenance period, operation becomes possible in a state in which load balancing has been completed.

Mode for the Invention 3

Figure 22:
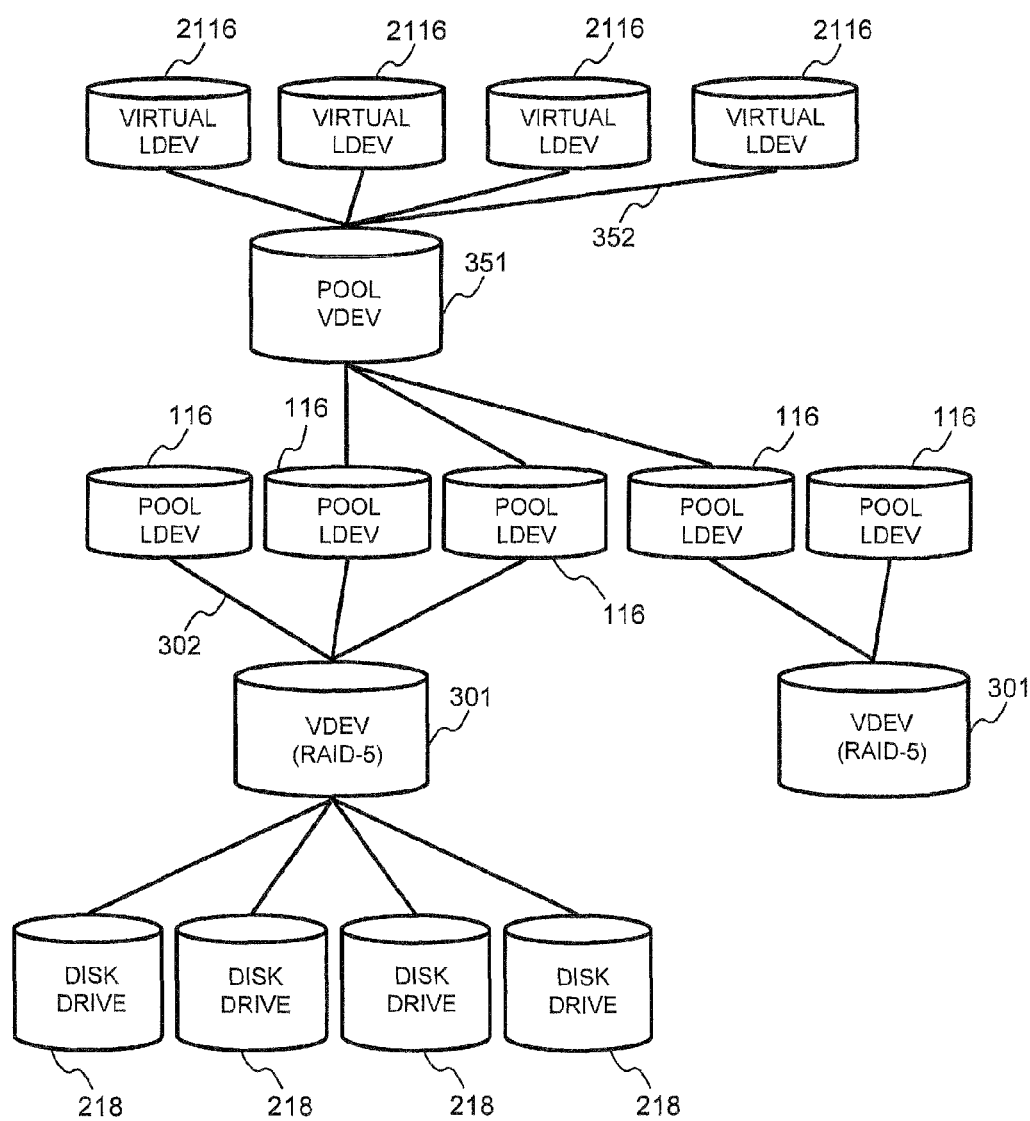
FIG. 22 shows a storage area management scheme in a storage system of a third embodiment.

FIG. 22 shows a method for managing a storage area in the storage system of a third embodiment.

LDEV 116 that have been formed based on the VDEV 301 include LDEV that are provided to the host 102 the same as in the first embodiment, and also LDEV (hereinafter, pool LDEV) 116 regarded as components of a pool VDEV 351 that is not provided to the host 102 as shown in FIG. 22. In FIG. 22, one pool VDEV 351 is configured from three pool LDEV 116.

The pool VDEV 351 has a plurality of real areas. Virtual LDEV 2116 are associated to the pool VDEV 351. The virtual LDEV 2116 have a plurality of virtual areas (address spaces).

I/O processing for the virtual LDEV 2116, for example, is as follows.

That is, in a case where a write command has been received for the virtual LDEV 2116, a determination is made as to whether or not a real area has been allocated to the virtual area (write virtual area) specified in this command. If a real area has been allocated, the write data is written to this real area. If a real area has not been allocated, an unallocated real area inside the pool VDEV 351 is allocated to the write virtual area. The write data is written to the allocated real area.

In a case where a read command has been received for the virtual LDEV 2116, read data is read out from the real area allocated to the virtual area specified by this command. The read-out read data is sent to the host.

In this embodiment, when a virtual LDEV 2116 has been added (and/or when a MP-PK has been added), the LDEV owner right changes. In this embodiment, the owner right of the virtual LDEV 2116 rather than the LDEV 116 is assigned to the MP-PK 115.

The LI of the virtual LDEV 2116, for example, is determined as follows.

For example, it is supposed that the pool VDEV 351 shown in the drawing is configured from three pool LDEV 116 having LI of "10". In accordance with this, the LI of the pool VDEV 351 is 30 (3×10). Then, four virtual LDEV 2116 are associated to this pool VDEV 351. For this reason, the LI of each virtual LDEV 2116 is regarded as 7.5 (30/4).

Figure 23:
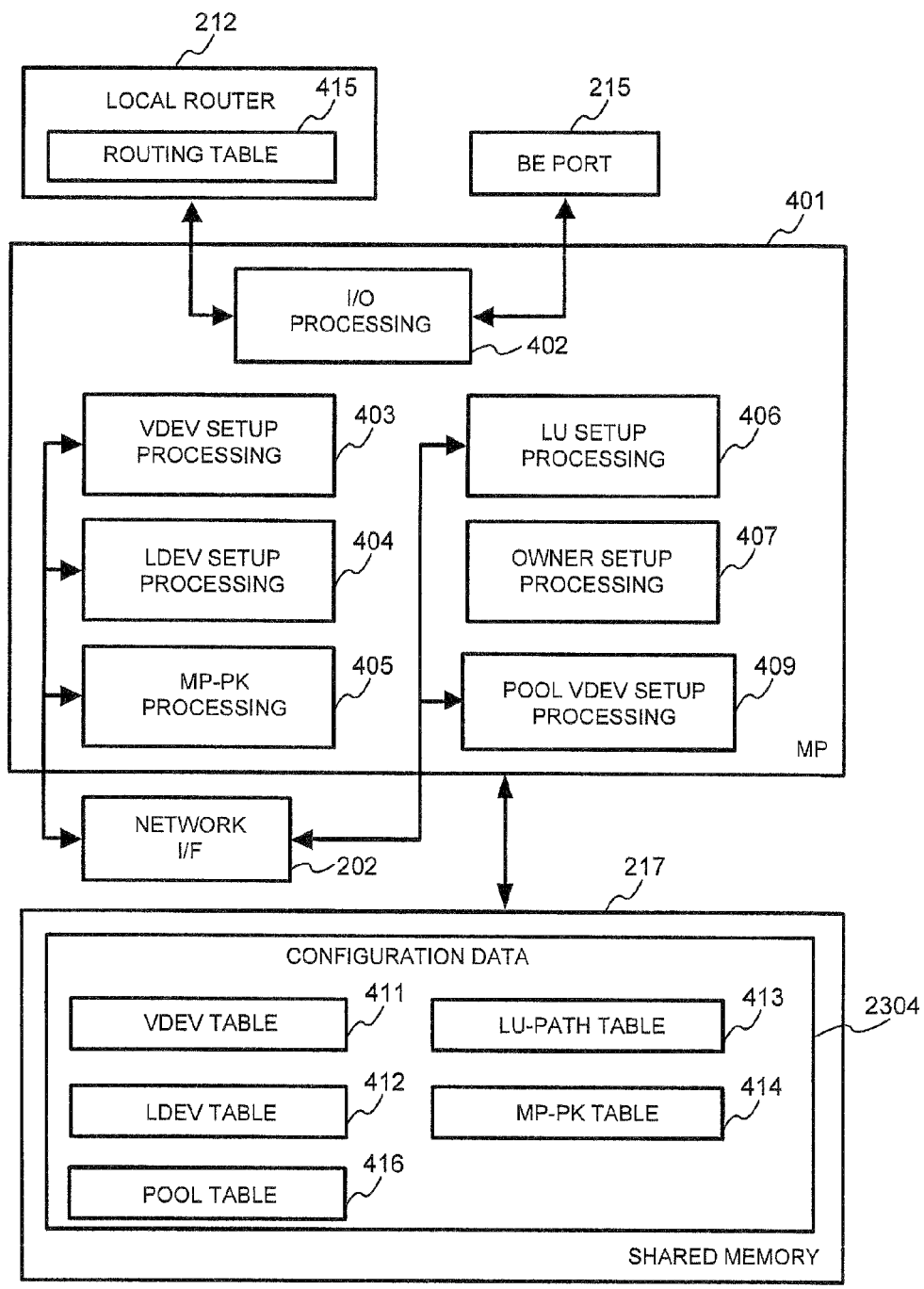
FIG. 23 shows computer programs that are executed by MP 213 in the third embodiment, and the configuration data 2304 in the third embodiment.

FIG. 23 shows the computer programs executed by the MP 213 in the third embodiment, and the configuration data 2304 of the third embodiment.

In the MP 213, a pool VDEV setup processing program 409 is executed. The pool VDEV setup processing program 409 performs a setup process for the pool VDEV 351.

The configuration data 2304 comprises a pool table 416. Information related to the pool VDEV 351 is set in the pool table 416.

Figure 24:
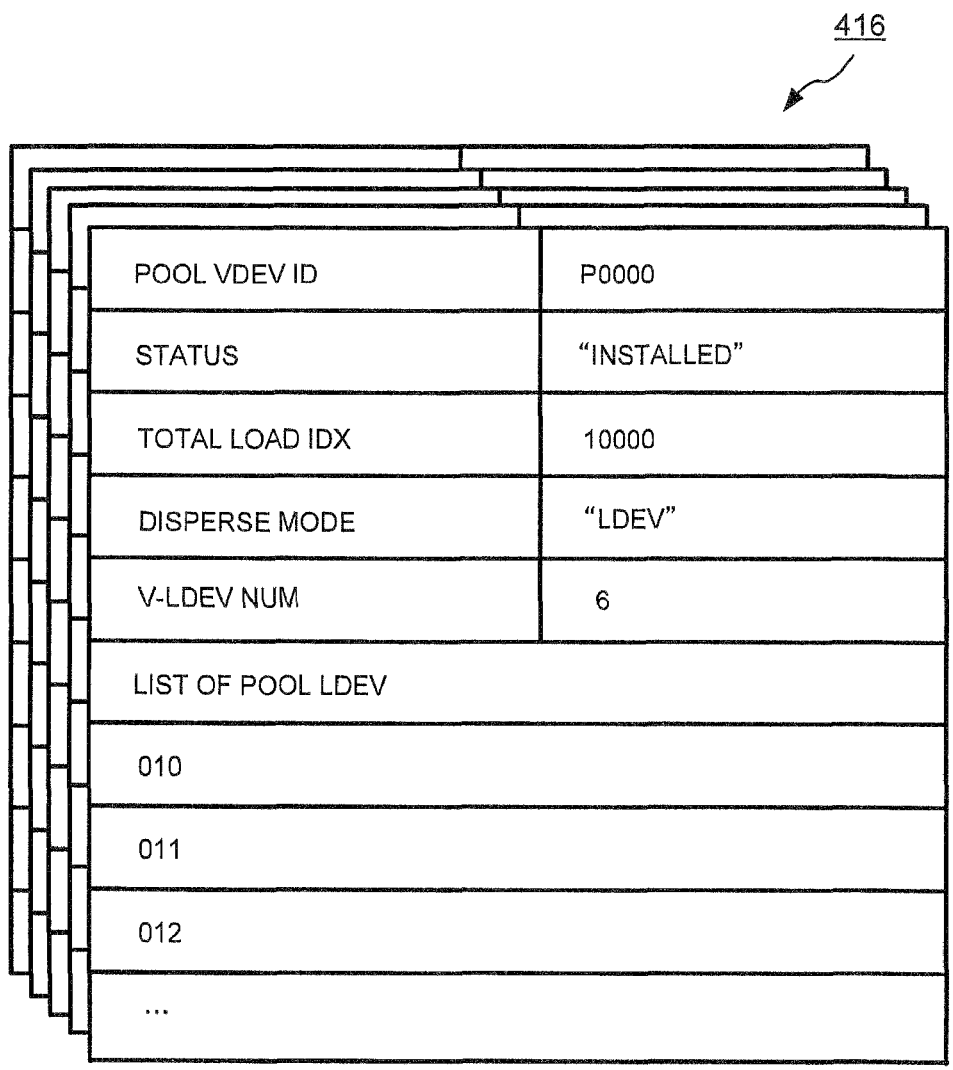
FIG. 24 shows the configuration of a pool table 416.

FIG. 24 shows the configuration of the pool table 416.

The pool table 416 has a VDEV ID, a status, a total LI, a disperse mode, a number of virtual LDEV (V-LDEV NUM), and a pool LDEV ID list for each pool VDEV. These elements will be explained hereinbelow by giving as an example one pool LDEV (hereinafter referred to as the "target pool LDEV" in the explanations of FIGS. 24 through 26).

The VDEV ID is the target pool VDEV identifier.

The status is the status of the target pool VDEV. The status values, for example, include "Installed", which is the state in which the target pool VDEV has been mounted.

The total LI is the total LI of all the pool LDEV configuring the target pool VDEV. The LI of the respective virtual LDEV associated to the target pool VDEV is computed by (total LI of target pool VDEV)/(number of virtual LDEV associated to target pool VDEV).

The disperse mode is related to the automatic balancing of the owner rights of virtual LDEV associated to the target pool VDEV. Unlike in the first embodiment, the value of the disperse mode is regarded solely as "LDEV", which sets the owner right in virtual LDEV units.

The number of virtual LDEV is the number of virtual LDEV associated to the target pool VDEV.

The pool LDEV ID list is a list of identifiers of the pool LDEV configuring the target pool VDEV.

Figure 25:
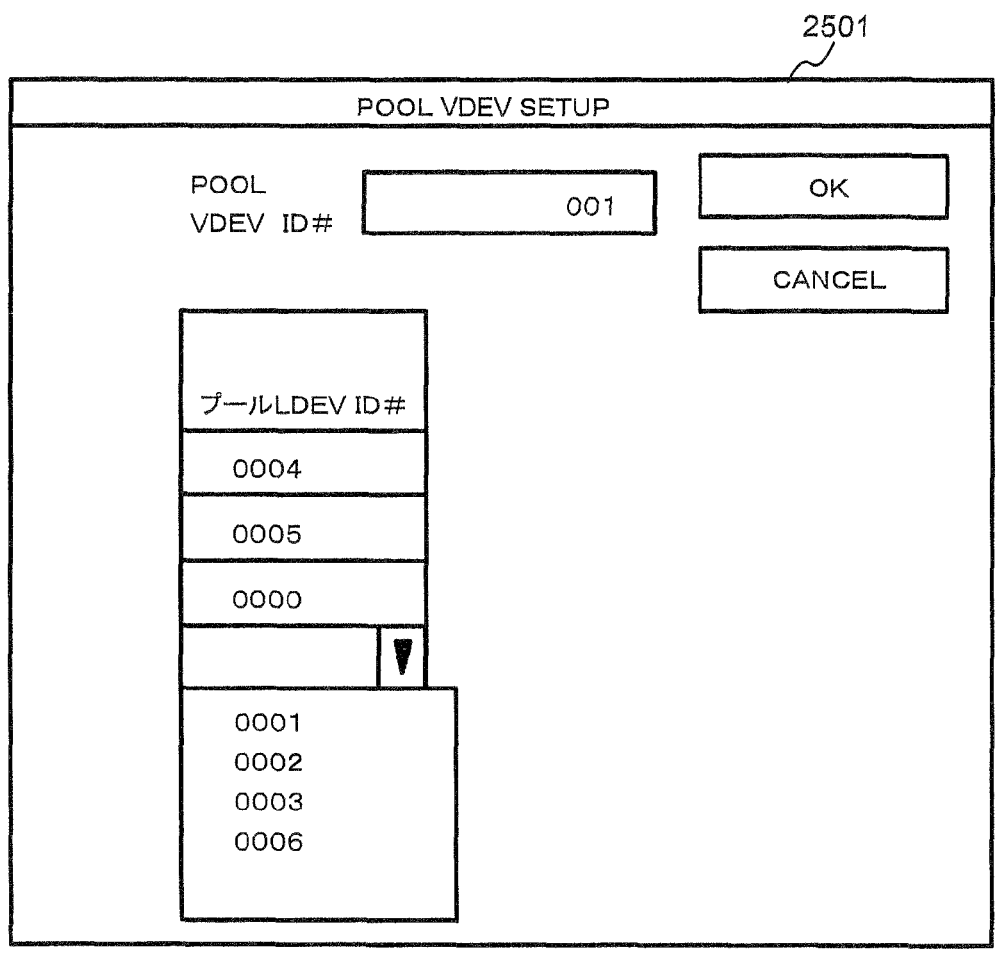
FIG. 25 shows a pool VDEV setup window 2501.

FIG. 25 shows a pool VDEV setup window 2501.

This window 2501 is for inputting various pool table 416 parameters from the management computer 101. For this window 2501, a pool VDEV ID, and ID of pool LDEV configuring the target pool VDEV are specified for the target pool VDEV by the operator of the management computer 101.

Figure 26:
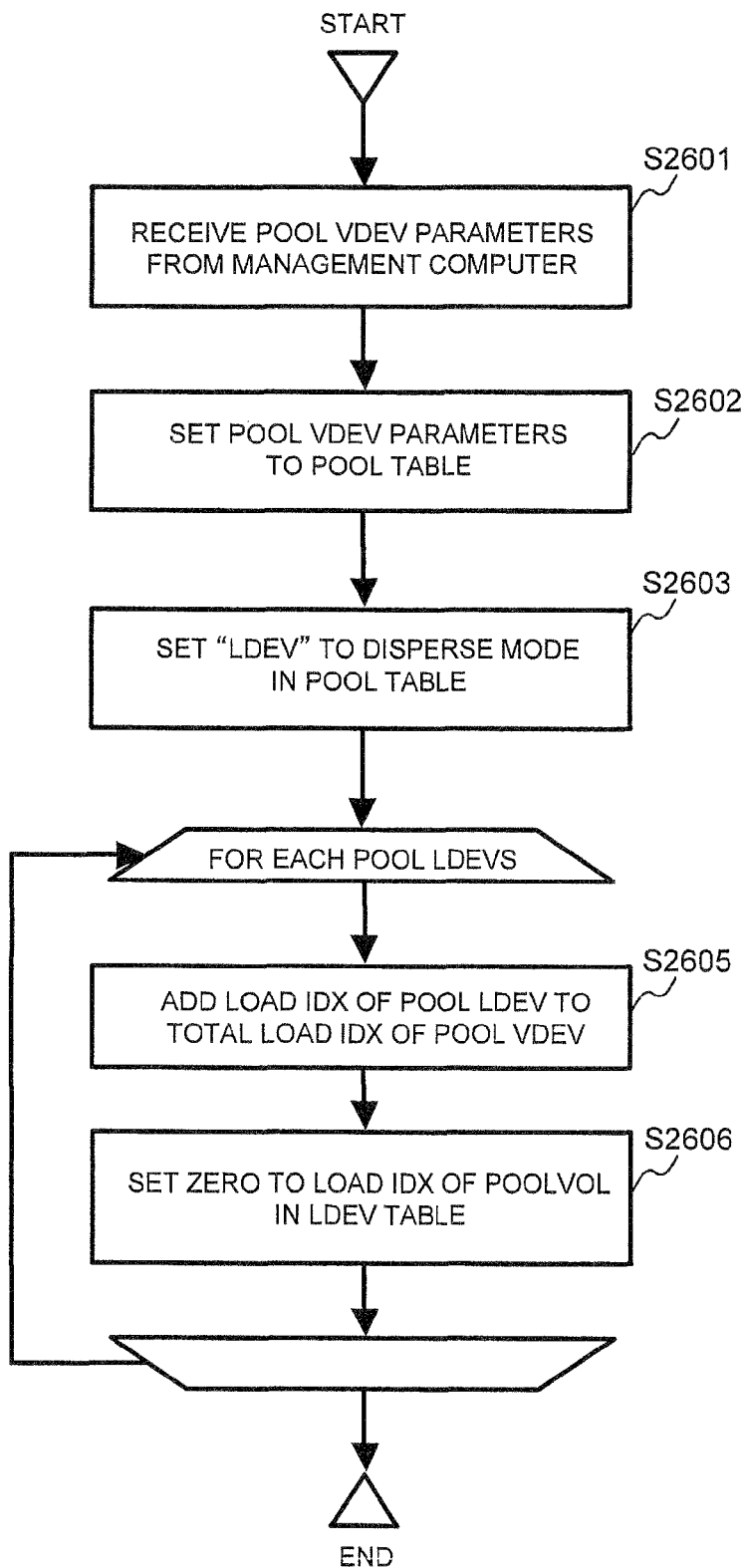
FIG. 26 shows the flow of pool VDEV setup processing.

FIG. 26 shows the flow of pool VDEV setup processing.

The pool VDEV setup processing program 409 receives from the management computer 101 the parameters (pool VDEV ID, pool LDEV ID) inputted via the window 2501 of FIG. 25 (S2601).

The program 409 sets the received parameters in the pool table 416 (S2602).

The program 409 sets "LDEV" in the pool table 416 as the disperse mode of the target pool VDEV (S2603).

S2605 and S2606 are carried out for each pool LDEV configuring the target pool VDEV.

In S2605, the program 409 adds the LI of the pool LDEV configuring the target pool VDEV to the total LI of the target pool VDEV (S2605).

In S2606, the program 409 changes the LI of this pool LDEV (LI in the LDEV table 412) from the current value to zero, which is a value that is not valid.

FIG. 27 shows the overall flow of virtual LDEV augmentation.

The management computer 101 displays the pool VDEV setup window 2501 (refer to FIG. 25), and receives the input of parameters from the operator (S2702). The management computer 101 sends the inputted parameters to the storage system 111.

The pool VDEV setup processing program 409 performs pool VDEV setup processing (refer to FIG. 26) (S2702). Here, as was explained hereinabove, "LDEV" is always set, as the disperse mode, to the pool table 416. The LI of the pool LDEV configuring the pool VDEV is also updated to zero.

Thereafter, the same processing as S1704 through S1708 is carried out (S2703 through S2707).

According to the third embodiment of the present invention above, it is possible to change the LDEV owner right immediately after a configuration change even using a capacity expanding technique (for example, the so-called Thin Provisioning technique). The owner rights of the virtual LDEV are set in virtual LDEV units.

A number of preferred embodiments of the present invention have been described hereinabove, but these are examples for explaining the present invention, and do not purport to limit the scope of the present invention solely to these embodiments. The present invention may also be put into practice in a variety of other modes.

For example, at least two or more of the first through the third embodiments may be combined. Specifically, for example, when augmenting the MP-PK, owner rebalance processing may also be performed in the third embodiment the same as in the second embodiment.

The changing of the LDEV owner right may also be carried out when there is an instruction from the operator.

Further, owner rebalance processing may be carried out when removing a MP-PK either instead of or in addition to when augmenting a MP-PK. In this case, the LDEV owner right assigned to the removed MP-PK is dispersed to the remaining MP-PK.

The addition and/or deletion of a LDEV may be carried out during operation. Similarly, the augmentation and/or removal of a MP-PK may be carried out while operation is in progress.

Further, the addition and/or deletion of a LDEV may also be carried out during a period when the overall load of the storage system 1801 is low (for example, at night). Similarly, the augmentation and/or removal of a MP-PK may also be carried out during a period when the overall load of the storage system 1801 is low (for example, at night).

Load balancing may also be carried out in accordance with the load of each MP-PK while operation is in progress during a period when the overall load of the storage system 1801 is low (for example, at night).

The present invention, for example, is also applicable to various technologies, such as an external connection (a technology in which a first storage system provides a storage resource inside a second storage system to the host just as if the storage resource were inside the first storage system).

The invention claimed is:

1. A storage system comprising:
    a plurality of processor units, each of which includes a processor that processes an I/O (Input/Output) command from an external device; and
    a plurality of storage devices providing one or more RAID groups (VDEVs), each of which including a plurality of logical volumes (LDEVs), the storage devices storing a load index determined for each of the LDEVs,
    wherein each of the processor units has at least one owner right for one of the LDEVs,
    wherein the load index of each of the LDEVs is a static value that does not dynamically change in accordance with the number of I/O commands to the LDEV,
    wherein when adding a new LDEV, any of the plurality of processor units, based on the following (X1) and (X2):
    (X1) the load index assigned to each of the processor units; and
    (X2) the load index of each of the LDEVs, selects, from among the processor units, a processor unit which has the lowest load index (X1) as an assignment-destination of an owner right for the new LDEV, and assigns this owner right to the selected processor unit,
    wherein the (X1) load index of the processor unit is sum of the load indexes of one or more LDEVs (X2) corresponding to one or more owner rights that have been assigned to the processor unit, and
    wherein, the (X2) load index of each of the LDEVs is determined by the following formula:

(X2)=(an average time per an I/O process)×(drive performance)×(the number of storage drives serving as the basis for one of the VDEVs that constitutes the basis of the LDEV)/(the average number of drive accesses per I/O process)/(the number of one or more LDEVs included in the VDEV that constitutes the basis of the LDEV).

2. The storage system according to claim 1, further comprising:
    an interface device that receives an I/O command from the external device,
    wherein routing information is set in the interface device, the routing information includes LDEV-related information and information related to the processor unit to which the owner right of this LDEV has been assigned, the interface device, upon receiving an I/O command, recognizes the processor unit that has been assigned with the owner right of the LDEV specified in this I/O command based on the routing information, and transfers the received I/O command to this processor unit, each LDEV is based on any VDEV, the VDEV is a virtual storage device based on a RAID (Redundant Array of Independent (or Inexpensive) Disks) group configured from a plurality of PDEVs, the PDEV is a physical storage device, the RAID level of the VDEV is the RAID level of the RAID group on which this VDEV is based, the storage resource stores configuration data, the configuration data includes the following information:

(Y1) information representing which LDEV constitutes the basis for which VDEV;

(Y2) information representing the RAID level of each VDEV; and (Y3) information representing types of PDEV that constitute the basis for each VDEV, the load index of the LDEV is a value determined based on the following three elements:

(Z1) the type of PDEV that constitutes the basis of the VDEV on which the LDEV is based;

(Z2) the RAID level of the VDEV on which the LDEV is based; and (Z3) the number of LDEV based on the VDEV on which the LDEV is based, any of the plurality of processor units carries out the following processing:

(A) when an LDEV is added:

(a1) computing the load index of the added LDEV on the basis of the elements (Z1) through (Z3) specified from the configuration information;

(a2) recognizing the processor unit for which the (X1) load index is the smallest; and (a3) assigning the owner right for the added LDEV to the processor unit recognized in the (a2), (B) when a new processor unit is added to the two or more processor units:

(b1) computing an average value of the (X1) load index for the two or more processor units; and (b2) changing the LDEV owner right based on the (X1) load index for each of the two or more processor units, the LDEV load index, the average value, and the (X1) load index for the added processor unit, and (C) updates the routing information subsequent to the (a3) and the (b2).

3. The storage system according to claim 2, wherein
any of the plurality of processor units determines whether or not the following conditions (p1) and (p2) have been satisfied even when a certain owner right of a LDEV changes from a first processor unit to the added second processor unit in the (b2):

(p1) the (X1) load index for the first processor unit is not less than the average value; and (p2) the (X1) load index for the second processor unit is not more than the average value, and when the result of this determination is affirmative, changes this owner right from the first processor unit to the second processor unit, and when the result of this determination is negative, does not change this owner right.

4. The storage system according to claim 2, wherein a first type PDEV, and a second type PDEV for which I/O performance is higher than the first type PDEV are provided, any of the plurality of processor units, when setting the VDEV, determines a change mode of the owner right for the LDEV that is based on this VDEV, a change mode that changes the owner right in VDEV units is employed in a case where the configuration information specifies that the VDEV is based on the first type PDEV, a change mode that changes the owner right in LDEV units is employed in a case where the configuration information specifies that the VDEV is based on the second type PDEV, and in the (a3) and the (b2), the owner right is changed in accordance with the employed change mode.

5. The storage system according to either claim 2, wherein the VDEV include a first VDEV, which is a pool having a plurality of real areas, and a second VDEV that is based on a PDEV, as the LDEV, a virtual LDEV having a plurality of virtual areas, and a pool LDEV which is a component of the first VDEV, and which is LDEV based on the second VDEV, are provided, the interface device, upon receiving a write command as an I/O command for a virtual LDEV, transfers this write command to the processor unit having the owner right for this virtual LDEV, the processor unit, which receives the write command, allocates an unallocated real area of the first VDEV to the virtual area specified on the basis of this write command, and stores write-targeted data in this real area, any of the plurality of processor units determines the load index of the first VDEV based on the load index of the pool LDEV configuring the first VDEV, and thereafter, changes the load index of this pool LDEV to a value that is not valid, in the (A) when a virtual LDEV is added, the load index of this virtual LDEV is determined based on the load index of the first VDEV with which this virtual LDEV is associated, and the number of virtual LDEV that are associated with this first VDEV, the (X1) load index of the processor unit is a value based on the load index of one or more virtual LDEV respectively corresponding to one or more owner rights that have been assigned to this processor unit, and the owner right for the virtual LDEV is changed in virtual LDEV units.

6. The storage system according to claim 1, wherein each LDEV is based on any VDEV, wherein the VDEV is a virtual storage device based on a RAID (Redundant Array of Independent (or Inexpensive) Disks) group configured from a plurality of PDEV, wherein the PDEV is a physical storage device, wherein the RAID level of the VDEV is the RAID level of the RAID group constituting the basis for this VDEV, and wherein the load index of the LDEV is a value determined based on the following three elements:

(Z1) the type of PDEV that constitutes the basis of the VDEV on which the LDEV is based;

(Z2) the RAID level of the VDEV on which the LDEV is based; and (Z3) the number of LDEV based on the VDEV on which the LDEV is based.

7. The storage system according to claim 1, wherein any of the plurality of processor units carries out the following processing when a LDEV is added:
- (a1) computing the load index of the added LDEV;
- (a2) recognizing the processor unit for which the (X1) load index is the smallest; and
- (a3) assigning the owner right for the added LDEV to the processor unit recognized in the (a2).

8. The storage system according to claim 1, wherein any of the plurality of processor units carries out the following processing:
- (b1) computing a target value based on the (X1) load indices for the processor units; and
- (b2) changing the LDEV owner right based on the (X1) load index for each of the processor units, the LDEV load index, the target value, and the (X1) load index for an added processor unit.

9. The storage system according to claim 8, wherein the (b1) and (b2) are carried out in a case where a new processor unit has been added to the two or more processor units.

10. The storage system according to claim 8, wherein in the (b2) any of the plurality of processor units determines whether or not the following conditions (p1) and (p2) have been satisfied even when a certain owner right of a LDEV changes from a first processor unit to the added second processor unit:
- (p1) the (X1) load index for the first processor unit is not less than the target value; and
- (p2) the (X1) load index for the second processor unit is not more than the target value, and
- when the result of this determination is affirmative, changes this owner right from the first processor unit to the second processor unit, and when the result of this determination is negative, does not change this owner right.

11. The storage system according to claim 1, wherein each LDEV is based on any VDEV,
- the VDEV is a virtual storage device based on a plurality of PDEVs,
- the PDEV is a physical storage device,
- a first type PDEV and a second type PDEV, for which I/O performance is higher than the first type of PDEV, are provided,
- any of the plurality of processor units determines a change mode of the owner right for the LDEV that is based on the VDEV,
- a change mode that changes the owner right in VDEV units is employed in a case where this VDEV constitutes the basis for the first type PDEV, and
- a change mode that changes the owner right in LDEV units is employed in a case where this VDEV constitutes the basis for the second type PDEV.

12. The storage system according to claim 1, wherein a first VDEV, which is a pool having a plurality of real areas, and a second VDEV, which is based on a PDEV, are provided,
- the VDEV is a virtual storage device,
- the PDEV is a physical storage device,
- as the LDEV, a virtual LDEV having a plurality of virtual areas, and a pool LDEV which is a component of the first VDEV, and which is LDEV based on the second VDEV, are provided,
- any of the plurality of processor units determines the load index of the first VDEV based on the load index of the pool LDEV that configure the first VDEV, and thereafter, changes the load index of this pool LDEV to a value that is not valid,
- the load index of the virtual LDEV is determined on the basis of the load index of the first VDEV with which this virtual LDEV is associated, and the number of virtual LDEV that are associated with this first VDEV, and
- the (X1) load index of the processor unit is a value based on the load index of one or more virtual LDEV respectively corresponding to one or more owner rights that have been assigned to this processor unit.

13. The storage system according to claim 12, wherein the owner right of the virtual LDEV is changed in virtual LDEV units.

14. The storage system according to claim 1, wherein, any of the plurality of processor units, even when the LDEV has been deleted, does not execute an owner right change until a predetermined event has been detected.

15. A load-balancing method in a storage system which has a plurality of processor units each of which includes a processor unit that processes an I/O (Input/Output) command from an external device, and a plurality of storage devices providing one or more RAID groups (VDEVs), each of which including a plurality of logical volumes (LDEVs), the storage devices storing a load index determined for each of the LDEVs, the load-balancing method comprising the steps of:
- wherein each of the processor units has at least one owner right for one of the LDEVs, (M1) selecting a processor unit which has a lowest load index as an assignment destination of an owner right for a new LDEV from among the processor units based on the following (X1) and (X2) when adding the new LDEV:
- (X1) the load indices respectively assigned to each of the processor units; and
- (X2) the load index of each of the LDEVs; and
- (M2) assigning this owner right to the selected processor unit,
- wherein the (X1) load index for the processor unit is a sum of the load indexes of one or more LDEVs (X2) corresponding to one or more owner rights assigned to the processor unit, and
- wherein the load index of each of the LDEVs is a static value that does not dynamically change in accordance with the number of I/O commands to the LDEV, and
- wherein, the (X2) load index of each of the LDEVs is determined by the following formula:

(X2)=(an average time per an I/O process)×(drive performance)×(the number of storage drives serving as the basis for one of the VDEVs that constitutes the basis of the LDEV)/(the average number of drive accesses per I/O process)/(the number of one or more LDEVs included in the VDEV that constitutes the basis of the LDEV).

* * * * *